United States Patent
Ilda et al.

(10) Patent No.: US 8,433,128 B2
(45) Date of Patent: Apr. 30, 2013

(54) METHOD OF CREATING THREE-DIMENSIONAL MODEL AND OBJECT RECOGNIZING DEVICE

(75) Inventors: Toyoo Ilda, Nagaokakyo (JP); Kengo Ichimura, Toyonaka (JP); Junichiro Ueki, Nara (JP); Kazuhiro Shono, Kyoto (JP); Yoshizo Togawa, Kyoto (JP); Akira Ishida, Shizuoka (JP)

(73) Assignee: Omron Corporation, Kyoto (JP)

( * ) Notice: Subject to any disclaimer, the term of this patent is extended or adjusted under 35 U.S.C. 154(b) by 501 days.

(21) Appl. No.: 12/611,568

(22) Filed: Nov. 3, 2009

(65) Prior Publication Data

US 2010/0111364 A1    May 6, 2010

(30) Foreign Application Priority Data

Nov. 4, 2008 (JP) ................. 2008-283150
Nov. 4, 2008 (JP) ................. 2008-283154

(51) Int. Cl.
    *G06K 9/00* (2006.01)
(52) U.S. Cl.
    USPC ........................................ 382/141; 382/154
(58) Field of Classification Search ............. None
    See application file for complete search history.

(56) References Cited

U.S. PATENT DOCUMENTS 7,928,977 B2 * 4/2011 Tanimura et al. ............ 345/419
2002/0052709 A1 * 5/2002 Akatsuka et al. ............ 702/153
2005/0276444 A1 * 12/2005 Zhou et al. .................... 382/103

FOREIGN PATENT DOCUMENTS

JP       2961264 B1    8/1999

OTHER PUBLICATIONS

Sumi, 3D Object Recognition in Cluttered Environments by Segment-Based Stereo Vision, 2002, International Journal of Computer Vision 46(1), pp. 5-23.*
Y. Sumi et al., "Three-Dimensional Object Recognition Using Stereo Vision," IEICE Transactions, D-11, vol. J80-D-II, No. 5, published May 1997, pp. 1105-1112.
Y. Kawai et al., "Stereo Correspondence Using Segment Connectivity," Information Processing Society of Japan, vol. 40, No. 8, Aug. 1999, pp. 3219-3229.

* cited by examiner

*Primary Examiner* — Andrew W Johns
*Assistant Examiner* — David F Dunphy
(74) *Attorney, Agent, or Firm* — Foley & Lardner LLP

(57) ABSTRACT

A polygonal mark M having a shape in which a direction can be uniquely specified is attached to a predetermined area of an actual model WM of a work to be three-dimensionally recognized. A process of changing the orientation of the actual model WM such that a state in which the mark M is contained in the view of each camera is maintained, and then performing the three-dimensional measurement is executed over a plurality of times. A predetermined number of, or two or more pieces of three-dimensional information is selected from the three-dimensional information restored by each measurement, these pieces of three-dimensional information are aligned and integrated, the information corresponding to the mark is deleted or invalidated from the integrated three-dimensional information, and the three-dimensional information after such a process is set as a three-dimensional model.

8 Claims, 21 Drawing Sheets

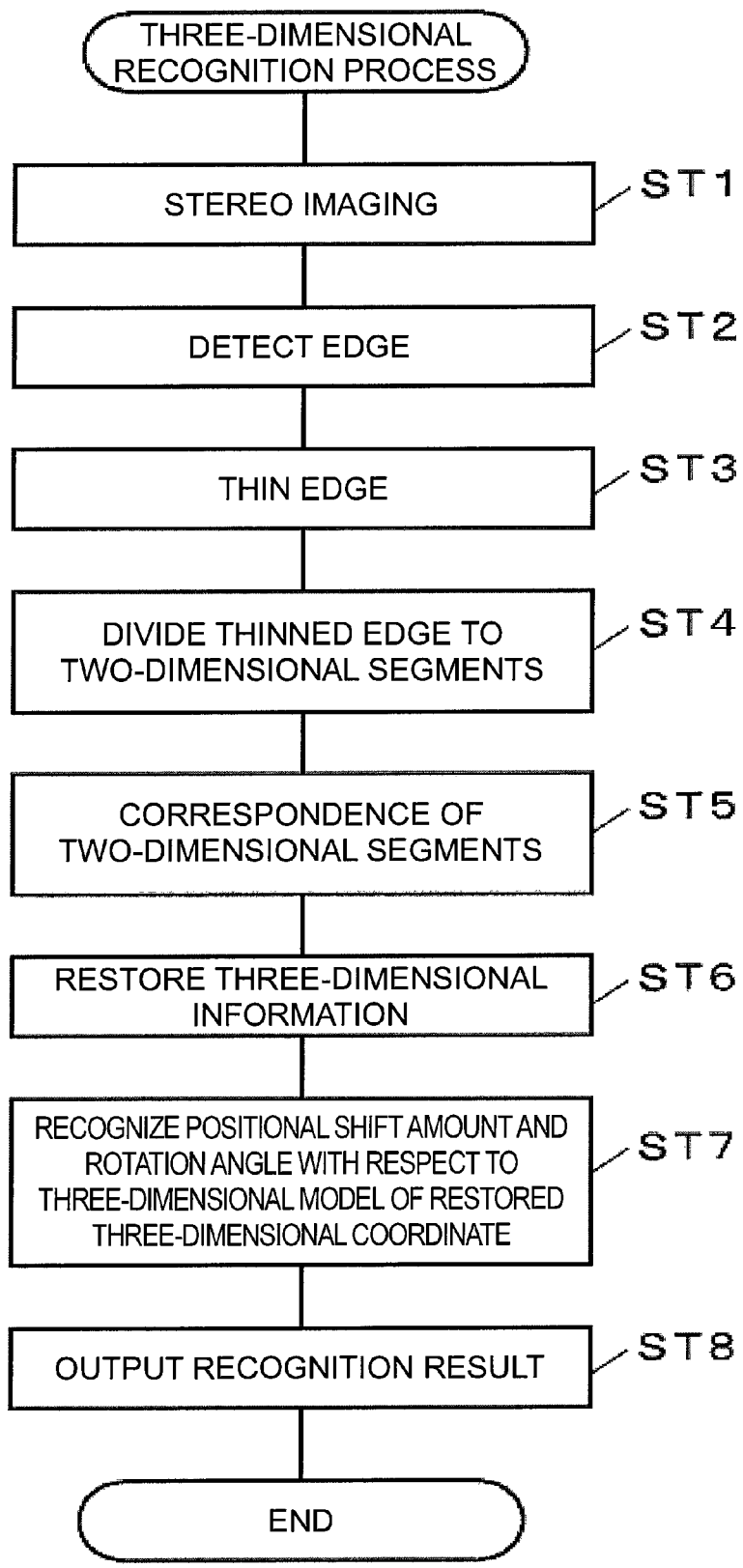

FIG. 8
FOR WORK OF BRIGHT COLOR
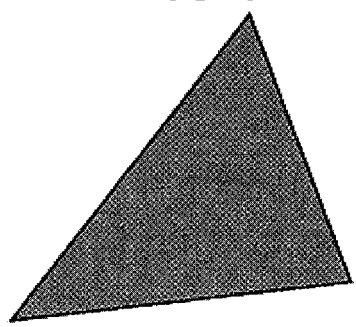
FOR WORK OF DARK COLOR
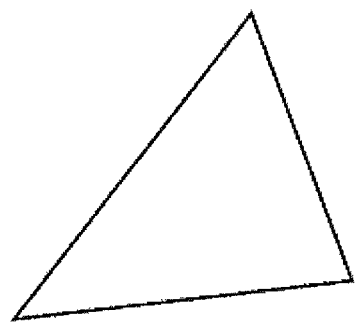

→ TARGET OF INTEGRATION

} NOT TARGET OF INTEGRATION

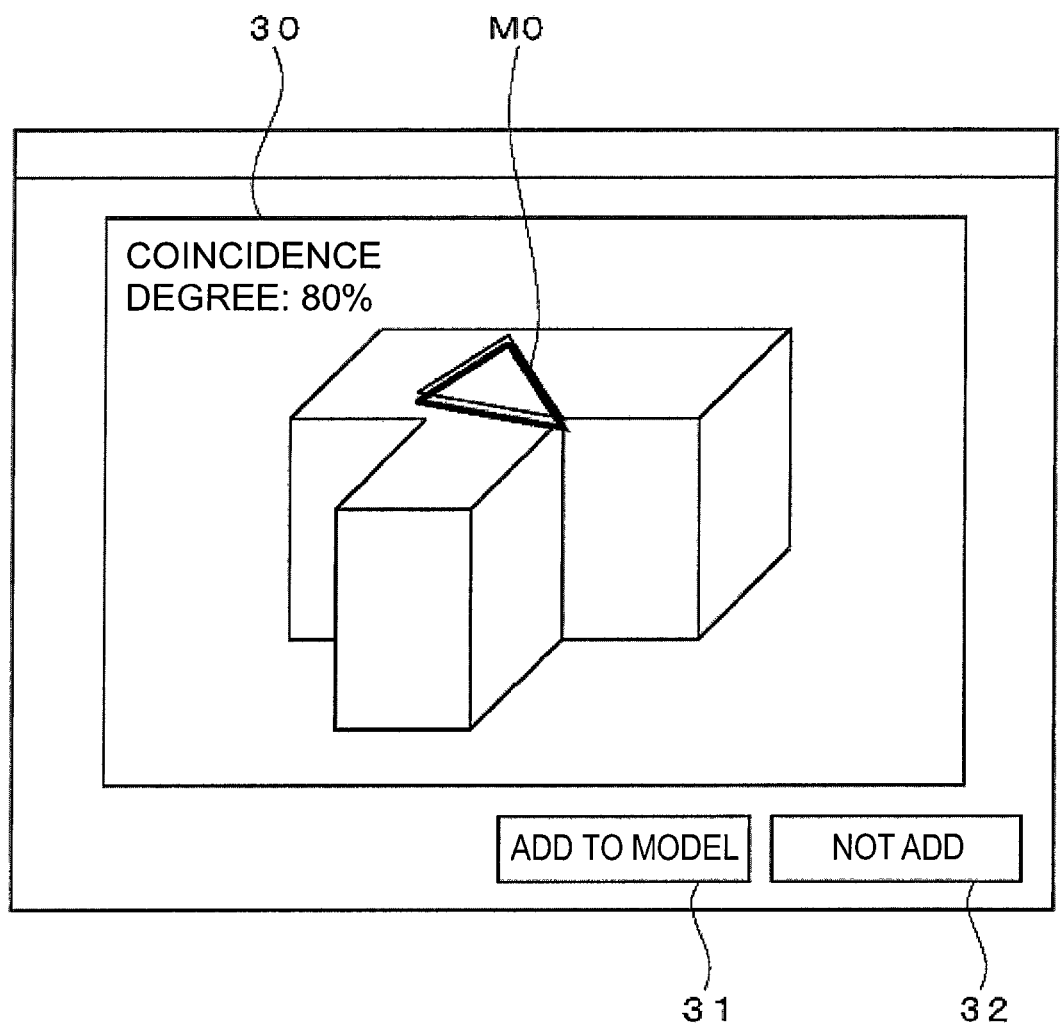

FIG. 19
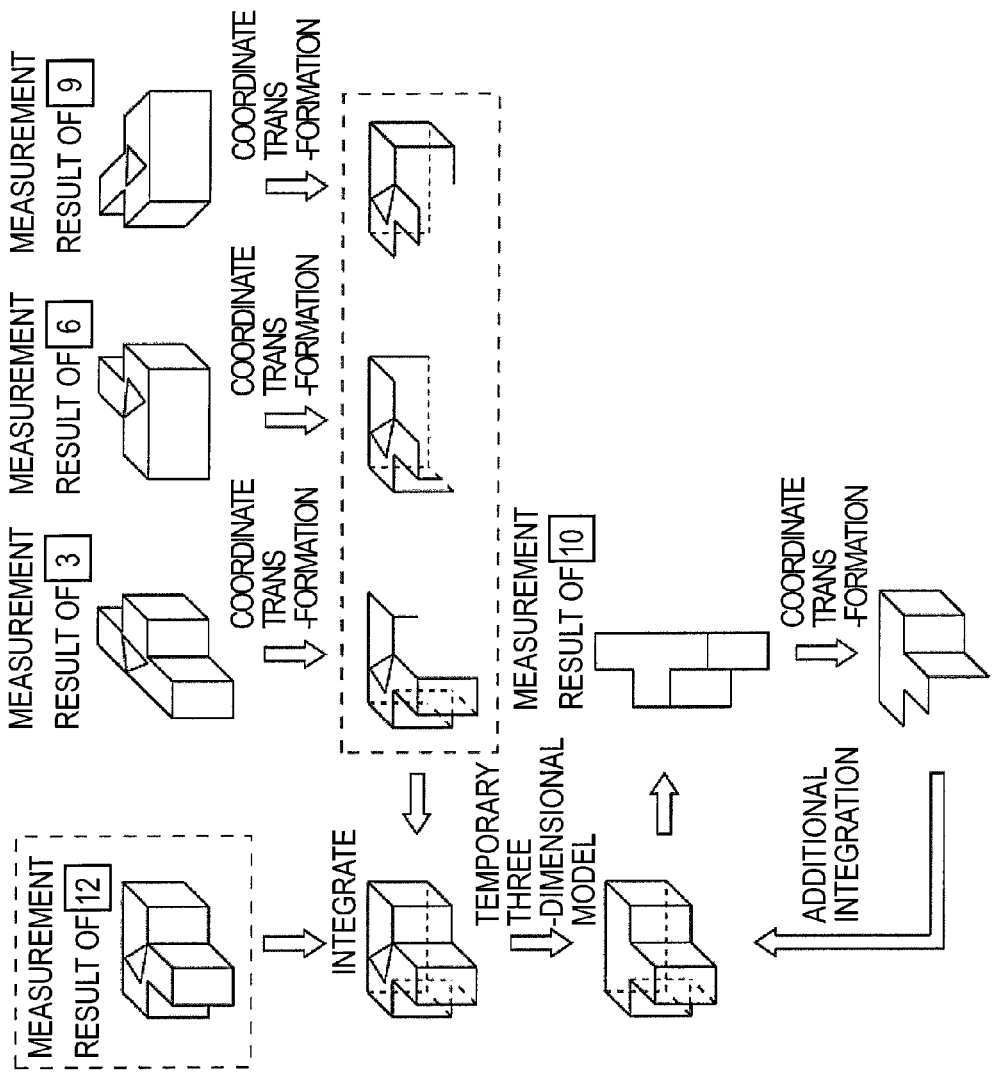
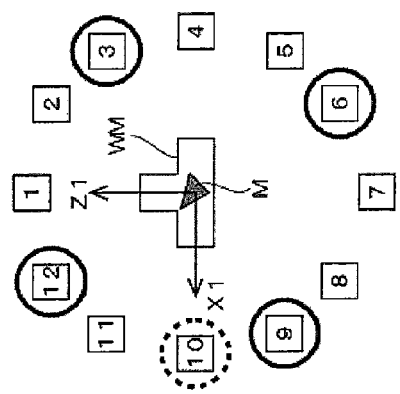

FIG. 20
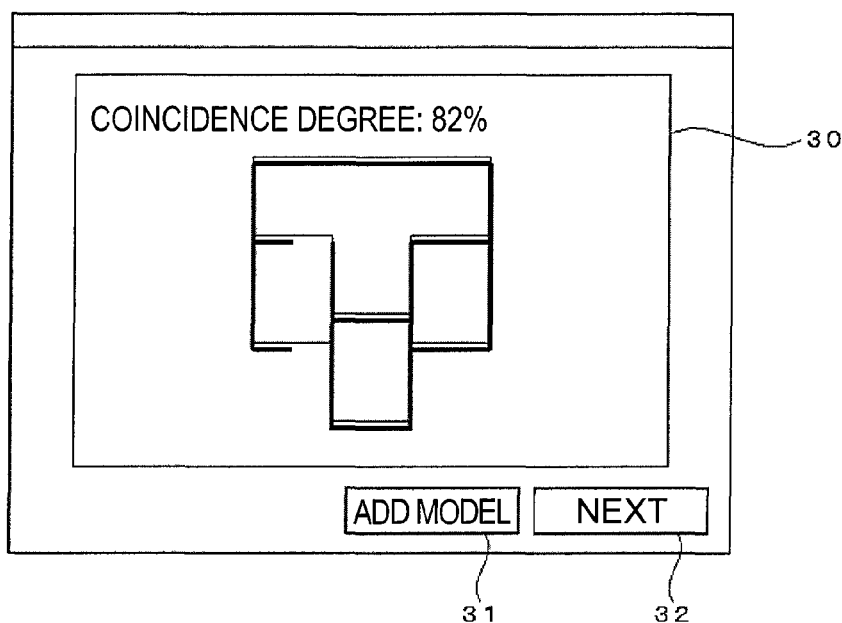
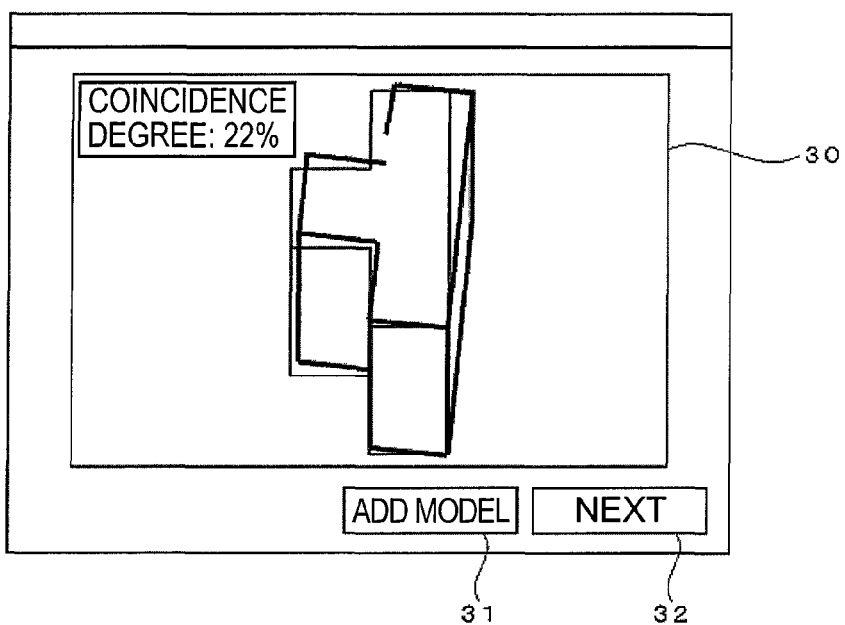
—— THREE-DIMENSIONAL INFORMATION TO BE RECOGNIZED
—— THREE-DIMENSIONAL MODEL

METHOD OF CREATING THREE-DIMENSIONAL MODEL AND OBJECT RECOGNIZING DEVICE

BACKGROUND OF THE INVENTION

This application is based on Japanese Patent Application Nos. 2008-283150 and 2008-283154 both filed with the Japan Patent Office on Nov. 4, 2008, the entire content of which is hereby incorporated by reference.

1. Technical Field

The present invention relates to a method of creating a three-dimensional model of an object to perform a process of recognizing the position and the orientation of the object using three-dimensional information restored by stereo measurement using a plurality of cameras with an object having a predetermined shape as a target. The present invention also relates to a device for performing, after creating and registering the three-dimensional model, a recognition process of the object using the model.

2. Related Art

A three-dimensional model containing three-dimensional information of various surfaces of an object to be recognized needs to be created to recognize the position and the orientation of the object by a three-dimensional recognition process using a stereo camera.

Japanese Patent Publication No. 2961264 (see paragraphs 0013, 0017, 0028 to 0036) discloses the invention having the above problems. Japanese Patent Publication No. 2961264 describes creating a geometric model of the entire object by performing the stereo measurement from a plurality of directions with respect to an actual model of a target object to be recognized and aligning and integrating three-dimensional information restored by each measurement.

Japanese Patent Publication No. 2961264 also describes restoring three-dimensional information of a contour line of the actual model from an edge shown in the stereo image through a method called "segment based stereo". According to Japanese Patent Publication No. 2961264, the "segment based stereo" is a process of dividing the edge in the stereo image into units called a "segment", and performing a stereo correspondence search in units of segments to restore the three-dimensional information of the contour line.

Furthermore, Japanese Patent Publication No. 2961264 describes a method of rotating an actual model to a defined angle using a rotary table and performing a coordinate transformation based on the rotational angle with respect to alignment of the three-dimensional information. As a method of aligning the three-dimensional information from an unknown observation direction, obtaining candidates of a plurality of alignments by matching the model being created and the newly restored three-dimensional contour line, and specifying the alignment when a coincidence degree becomes the highest are also described.

"Stereo Correspondence Using Segment Connectivity" Information Processing Society of Japan, Vol. 40, No. 8, pp. 3219-3229, published August 1999 describes in detail a method of corresponding the two-dimensional segment between images, and restoring the three-dimensional information. "Three-Dimensional Object Recognition Using Stereo Vision" IEICE Transactions, D-11, vol. J80-D-II, No. 5, pp. 1105-1112, published May 1997 discloses a method of matching the restored three-dimensional information with the three-dimensional model registered in advance, and recognizing the position and the orientation of the object.

SUMMARY

The invention described in Japanese Patent Publication No. 2961264 creates a three-dimensional model in which three-dimensional characteristics of an object seen from various directions are integrated, and thus a three-dimensional model suited for recognizing an object which position and orientation are not fixed, such as discretely stacked parts, can be created. However, if the three-dimensional model is created using the "method of aligning the three-dimensional information from an unknown observation direction" of Japanese Patent Publication No. 2961264, accuracy of the three-dimensional model is difficult to ensure for the following reasons.

The "method of aligning the three-dimensional information from an unknown observation direction" specifically calculates a coincidence degree by arbitrarily changing a positional relationship between an actual model and a stereo camera and corresponding the three-dimensional information restored through respective measurements between two executed stereo measurements in plural manners, and performs alignment using the correspondence relationship of when the coincidence degree is the highest. Therefore, if the correspondence between the three-dimensional information is not performed with satisfactory accuracy, the accuracy of the alignment cannot be ensured and the final three-dimensional model will not have a satisfactory accuracy.

First, if a chamfered portion or a curved surface is a measurement target, error in correspondence due to the cause shown in FIG. 17 may occur.

FIG. 17 shows an example of performing stereo measurement from two directions f1 and f2 with respect to a corner of a target object to be recognized Sb. This figure is a cross-section of the target object to be recognized Sb, where R1 and R2 in the figure correspond to boundary positions of a flat surface and a surface with large curvature.

In this example, the three-dimensional edge is restored at the position of R1 in the figure in the measurement from the f1 direction, whereas the three-dimensional edge is restored at the position of R2 in the measurement from the f2 direction. Therefore, when corresponding the three-dimensional information restored by the measurement from the respective directions, the edge corresponding to R1 and the edge corresponding to R2 may be falsely corresponded and the accuracy in alignment may degrade accordingly.

FIG. 18 shows an example in which an error occurred in correspondence of sites including a repetitive structure. Such false correspondence may occur when the edge of the repetitive structure is unclear and the restoring accuracy of the three-dimensional information is degraded.

Even when having an object with a symmetrical site as a recognizing target, a state where the front and the back of the symmetrical site are falsely corresponded may be recognized as correct.

Many industrial products and molded articles include chamfered portions or curved surfaces, and many repetitive structures and symmetrical sites are also recognized. Therefore, in creating the three-dimensional model related to such objects, a possibility that misalignment occurs due to the above-mentioned reasons becomes high, and the accuracy of the three-dimensional model becomes hard to ensure.

Therefore, in order to ensure the accuracy of the three-dimensional model in the invention described in Japanese Patent Publication No. 2961264, the method described in paragraph 0028 of the document, that is, the method of performing imaging with the actual model rotated at a defined angle every time using a rotary table, and performing coordinate transformation based on the known rotation angle needs to be adopted. In this method, however, a cost becomes high since equipment such as the rotary table is required. Furthermore, the load of a user becomes large as the rotation angle for every time needs to be accurately defined.

The present invention has been devised to solve the problems described above, and an object thereof is to be able to create a three-dimensional model of satisfactory accuracy even when adopting a method of performing a three-dimensional measurement by arbitrarily changing the positional relationship between the actual model and the camera, and aligning and integrating the three-dimensional information restored by each measurement.

The stereo image including a set of images obtained by performing imaging with each of a plurality of cameras, whose relative positions are fixed, is used in the method of creating the three-dimensional model according to the present invention, where a mark having a shape without rotation symmetric property is attached to a surface of an object, which is a target object to be recognized, and the imaging is executed over a plurality of times while the positional relationship of each camera and the object changed each time. The three-dimensional information representing the features of the contour line of the object and the mark are restored from the stereo image generated by each imaging. All pieces of three-dimensional information or two or more pieces of three-dimensional information corresponding to one part of the plurality of pieces of three-dimensional information restored by each imaging are aligned and then integrated. Furthermore, the information corresponding to the mark is erased or invalidated from the integrated three-dimensional information, and the three-dimensional information after such a process is confirmed as the three-dimensional model.

In the above description, the three-dimensional information restored by the three-dimensional measurement is a collection of plural pieces of three-dimensional feature data corresponding to the individual contour line of the object and the mark. The "alignment" of the three-dimensional information is the process of performing coordinate transformation on the plurality of pieces of three-dimensional information restored by the stereo measurement from different directions so as to eliminate the shift in between.

The "shape without rotation symmetric property" refers to a shape that does not overlap with the shape before rotation at any rotation angle when rotated in a range smaller than 360 degrees. The shape is desirably a shape that creates a significant difference between the coincidence degree of when corresponded without rotational shift with respect to the figure of the same shape and the coincidence degree by other correspondences.

The mark to be attached to the object is formed to a sheet-form by paper, cloth, resin, and the like, and is attached to the surface of the object. In this case, the mark can be readily attached as a so-called "sticker" by forming an adhesive layer on the back surface of the sheet configuring the mark. If the object is made of metal, a mark made of magnetic sheet may be formed so as be attached to the surface of the object by a magnetic force.

Desirably, a mark with a dark color is attached to an object of bright color and a mark with a bright color is attached to an object of dark color. An image with a strong contrast between the mark and the background thus can be generated, and the edge of the mark can be detected with satisfactory precision.

The imaging process performed through the above-described method is carried out with the same mark always contained in the view of all the cameras, and thus the three-dimensional information of the edge of the mark can be restored along with the contour line of the object. Furthermore, the edge of the mark can be set as the target of alignment even in the alignment process in integrating the three-dimensional information.

In the alignment of the three-dimensional information, the correspondence relationship of when the coincidence degree between the three-dimensional information becomes the highest is specified, and the positional shift and the angular shift between the three-dimensional information are resolved by the coordinate transformation based on such a correspondence relationship. Since the shape of the mark does not have a rotation symmetric property, the orientation of the mark represented by the restored three-dimensional information is unique for every measurement direction. Therefore, when corresponding the three-dimensional information of the mark, a shift always occurs at one of the sides or the vertices unless correctly aligned.

The coincidence degree of the mark portion of when the alignment is not correct thus can be greatly lowered even in the alignment of the three-dimensional information by defining the shape of the mark so that a great shift occurs at the side or the vertex of the mark when the alignment is not correct.

According to the above description, the coincidence degree of the entire three-dimensional information greatly fluctuates depending on whether or not the three-dimensional information of the mark is correctly aligned. In other words, the coincidence degree of when each portion including the mark is correctly corresponded has a sufficient magnitude, whereas if not correctly corresponded, the entire coincidence degree lowers by the great lowering in the coincidence degree of the mark portion. Therefore, even if the three-dimensional information of the object contains the feature having the possibility of being falsely corresponded, the alignment by such correspondence is prevented from being confirmed, and the three-dimensional model having satisfactory accuracy can be created.

In the above-described method, the mark may be a polygon or a plane figure having three or more vertices.

In the above-described method, the mark is desirably attached to a flat area at the surface of the object.

If the mark is attached to a curved surface, the three-dimensional information that greatly differs from the original information is restored for the mark depending on the magnitude of the curvature of such a surface, where the original three-dimensional information of the mark needs to be restored with satisfactory precision when performing matching based on the geometric features of the mark, as described below.

The mark may be integrally formed with the background having a color different from the mark, and such an integrated object may be attached to the surface of the object. In this manner, an area where the feature in which error easily occurs in correspondence upon alignment such as a repetitive structure appears may be covered with the integrated object.

In a method according to a preferred aspect, three-dimensional feature data representing a geometric feature of the mark is registered in advance. Then, prior to the process of integrating the three-dimensional information, the three-dimensional information restored by the stereo image generated by imaging of each time is matched with the three-dimensional feature data of the mark, whether or not the geometric feature of the mark is satisfactorily restored is determined, and the three-dimensional information determined that the geometric feature is not satisfactorily restored is excluded from a target of the integration process.

When performing the three-dimensional measurement by arbitrarily setting the positional relationship between the object and the camera each time, the accuracy of the information is difficult to check from the restored three-dimensional information unless the three-dimensional shape of the object is known. In the present invention, however, the dimension and the shape of the mark can be known in the course of designing and creating the mark, and the information representing the mark is contained in the measured three-dimensional information, and hence the accuracy of the three-dimensional information can be determined using the known geometric features of the mark. Therefore, the three-dimensional information with unsatisfactory accuracy can be eliminated from the integrating target based on the determination result, and the accuracy of the three-dimensional model can be further enhanced.

In another preferred aspect, in the process of restoring the three-dimensional information, a step of detecting an edge from the stereo image, a step of dividing the detected edge to a plurality of two-dimensional segments, a step of corresponding each two-dimensional segment between images, calculating a plurality of three-dimensional coordinates for every set of corresponding segments, and setting a three-dimensional segment including a line or a curve according to a distribution state of the three-dimensional coordinates, and a step of setting each three-dimensional segment or an intersection of extended lines as a feature point are executed. In the process of aligning before integrating of the three-dimensional information, with one of the three-dimensional information to be integrated as a reference, the other three-dimensional information are aligned so that the feature point and the three-dimensional segment most matches the reference three-dimensional information.

In the above aspect, each edge is divided into units of segments, and then correspondence and calculation of the three-dimensional coordinates are performed. Each intersection of the ultimately configured three-dimensional segments is set to the feature point, and a state in which the feature point and the three-dimensional segment match the reference three-dimensional information the most is assumed as an appropriate alignment state at the time of alignment. Thus, the three-dimensional model having satisfactory accuracy can be created while ensuring the accuracy of alignment by the three-dimensional segments of the mark.

In still another preferred aspect, first and second marks having a shape without rotation symmetric property is attached to different areas on the surface of the object, and the positional relationship between each camera and the object in the imaging are adjusted over a plurality of times so that a state in which each of the marks is contained in a view of all cameras is satisfied in a plurality of ways and a state in which both the first and the second marks are contained in the view of each camera is satisfied at least once. Moreover, the three-dimensional information restored from the stereo image of when imaged with only the first mark contained in the view of each camera and the three-dimensional information restored from the stereo image of when imaged with only the second mark contained in the view of each camera to the three-dimensional information restored from the stereo image of when imaged with both the first and the second marks contained in the view of each camera are aligned, and the pieces of the three-dimensional information are integrated.

When creating the three-dimensional model showing the entire configuration of the target object to be recognized, numerous modes need to be set for the positional relationship between the object and the camera so that each surface of the object becomes the target of imaging, but setting a state in which the mark is always contained in the view of all cameras is difficult to achieve by simply attaching one mark.

In this regard, the first and the second marks are attached to the object so that at least one of the marks is measured in the above aspect, and hence the range in which the positional relationship between the object and the camera can be changed is prevented from being limited. Since the three-dimensional information of when only the first mark is the measuring target and the three-dimensional information of when only the second mark is the measuring target can be aligned with the three-dimensional information of when both marks are the measurement targets set as a reference, the accuracy of alignment can be ensured. Note that the number of the second mark is not limited to one, and a plurality of second marks may be attached to different surfaces.

In yet another preferred aspect, a temporary three-dimensional model is created using the three-dimensional information restored by at least one set of stereo images of the object, and a coincidence degree between the three-dimensional information restored by the stereo image in a direction different from the direction employed when the three-dimensional information used in creating the temporary three-dimensional model with respect to the object is restored, and the temporary three-dimensional model is calculated. Moreover, the three-dimensional information, which is a target of calculation of the coincidence degree, is added to the temporary three-dimensional model when determined that the coincidence degree is low, and the three-dimensional model at a time point the adding process is completed is confirmed as a model to use for recognition of the object.

According to the above-described method, of the three-dimensional information obtained by measuring the object from a direction different from when the three-dimensional information used in creating the temporary three-dimensional model is restored, the three-dimensional information that is not correctly recognized as a result of lowering in the coincidence degree with respect to the temporary three-dimensional model can be added to the three-dimensional model. Thus, the three-dimensional model after the addition can correctly recognize the three-dimensional information by the measurement from the falsely recognized direction, and the accuracy of the three-dimensional model enhances accordingly. The three-dimensional information that is correctly recognized by the temporary three-dimensional model is not added to the three-dimensional model, and thus an increase in capacity due to addition of wasteful information is prevented.

The object recognizing device applied with the above-described method includes an image input unit for inputting a stereo image of a target object to be recognized generated by a plurality of cameras, whose relative positions are fixed, a three-dimensional measurement unit for restoring three-dimensional information from the stereo image, a recognition processing unit for recognizing a position and an orientation of the target object to be recognized by matching the three-dimensional information with a three-dimensional model registered in advance, and a three-dimensional model registering unit for creating and registering the three-dimensional model. The three-dimensional model registering unit also includes each portion of a mark registering portion, a measurement control portion, a determining portion, a three-dimensional information integrating portion, and a model confirming portion.

The mark registering portion registers three-dimensional feature data representing a geometric feature of a mark having a shape without rotation symmetric property. The measurement control portion accepts, assuming the target object to be recognized having the mark attached to a surface is imaged over a plurality of times while a positional relationship with respect to each camera is changed every time, the stereo image generated by each imaging from the image input unit, and causes the three-dimensional measurement unit to process the stereo image. The determining portion matches the three-dimensional information restored from the stereo image with the three-dimensional feature data registered in the mark registering portion and determines whether or not the geometric feature of the mark is satisfactorily restored.

The three-dimensional information integrating portion integrates the three-dimensional information after aligning, with two or more pieces of three-dimensional information that are determined that the geometric feature of the mark is satisfactorily restored out of the plurality of pieces of three-dimensional information restored with the imaging of a plurality of times. The model confirming portion erases or invalidates information corresponding to the mark in the integrated three-dimensional information, and confirms the three-dimensional information after such a process as a three-dimensional model.

In the above-described configuration, the process of determining whether or not the three-dimensional information of the mark is satisfactorily restored of the processes of the determining portion includes, in addition to a mode of being automatically executed in the device, a mode of displaying the matching result of the three-dimensional information and the three-dimensional feature data of the mark, and accepting the input of the determination result by the user.

According to the above-described device, the user attaches the mark having a shape without rotation symmetric property to an appropriate area of the target object to be recognized, adjusts the positional relationship between the target object to be recognized and the camera each time so that a state in which the same mark is commonly contained in the view of each camera is maintained, and performs imaging over a plurality of times to thereby select the three-dimensional information having satisfactory accuracy from the three-dimensional information restored from the stereo image of each imaging and create a three-dimensional model. Thus, after creating and registering the three-dimensional model having satisfactory accuracy, the position and the orientation of the object can be accurately recognized using such a three-dimensional model.

According to the present invention, the accuracy of alignment of the three-dimensional information can be enhanced by performing imaging over a plurality of times with a mark having a shape without rotation symmetric property attached to the surface of the target object to be recognized. Thus, even if the positional relationship between the target object to be recognized and the camera is arbitrarily changed, the accuracy of alignment of the three-dimensional information can be ensured and a three-dimensional model having satisfactory accuracy can be created. Furthermore, since the positional relationship does not need to be strictly adjusted, the trouble of the user that is required in creating the three-dimensional model can be reduced, and convenience can be enhanced.

BRIEF DESCRIPTION OF THE DRAWINGS

FIG. 3 is a flowchart showing a procedure of a three-dimensional recognition process;

FIG. 8 is a view showing a type of mark;

FIG. 12 is a view showing an example of a screen for selecting the three-dimensional information to use in the integration;

FIG. 19 is a view schematically showing a specific method of the process of creating the three-dimensional model;

FIG. 20 is a view showing an example of a check screen of the recognition result by the three-dimensional model.

DETAILED DESCRIPTION (1) Device Configuration

Figure 1:
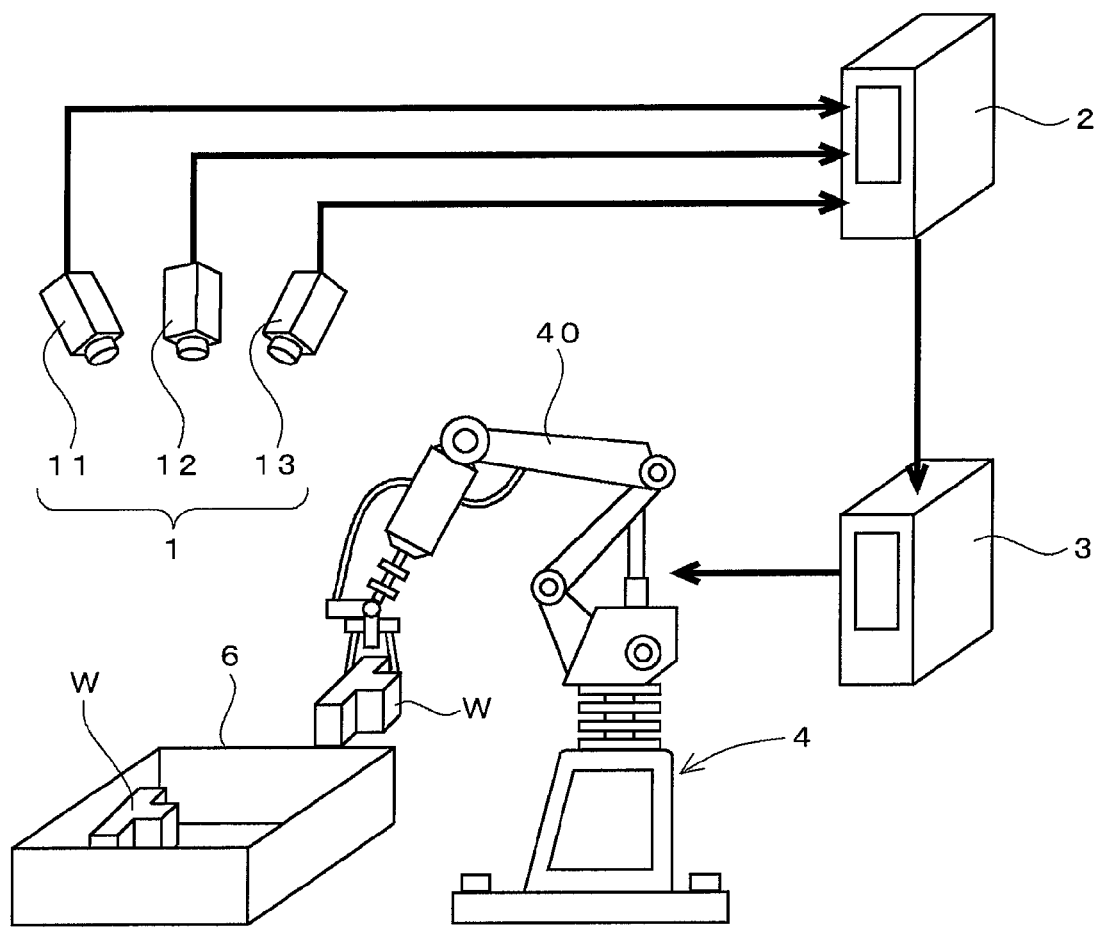
FIG. 1 is a view showing a schematic configuration of a picking system applied with a three-dimensional recognition process.

FIG. 1 shows an example of a picking system applied with a three-dimensional recognition process. The picking system performs a task of taking out a work W accommodated in an accommodation box 6 one at a time and conveying the work W to a predetermined position in a factory, and includes an articulated robot 4 that performs the actual task and a robot control device 3 for controlling the operation of the robot 4. The picking system also includes a stereo camera 1 and an object recognizing device 2 for recognizing the position and the orientation of the work W to be processed.

The stereo camera 1 is configured by three cameras 11, 12, 13 which positional relationship is fixed. The object recognizing device 2 is registered with information representing the positional relationship of the cameras 11, 12, 13, a direction of an optical axis, and the like, as well as a three-dimensional model of the work W to be recognized, and processes a stereo image inputted from each camera 11, 12, 13 to restore the three-dimensional information of the contour line of the work W, and then matches the restored three-dimensional information and the three-dimensional model to recognize the position and the orientation of the work W. The information indicating the recognition result is outputted from the object recognizing device 2 to the robot control device 3, and is used in the process of controlling an operation of an arm 40 of the robot 4 in the robot control device 3.

Figure 2:
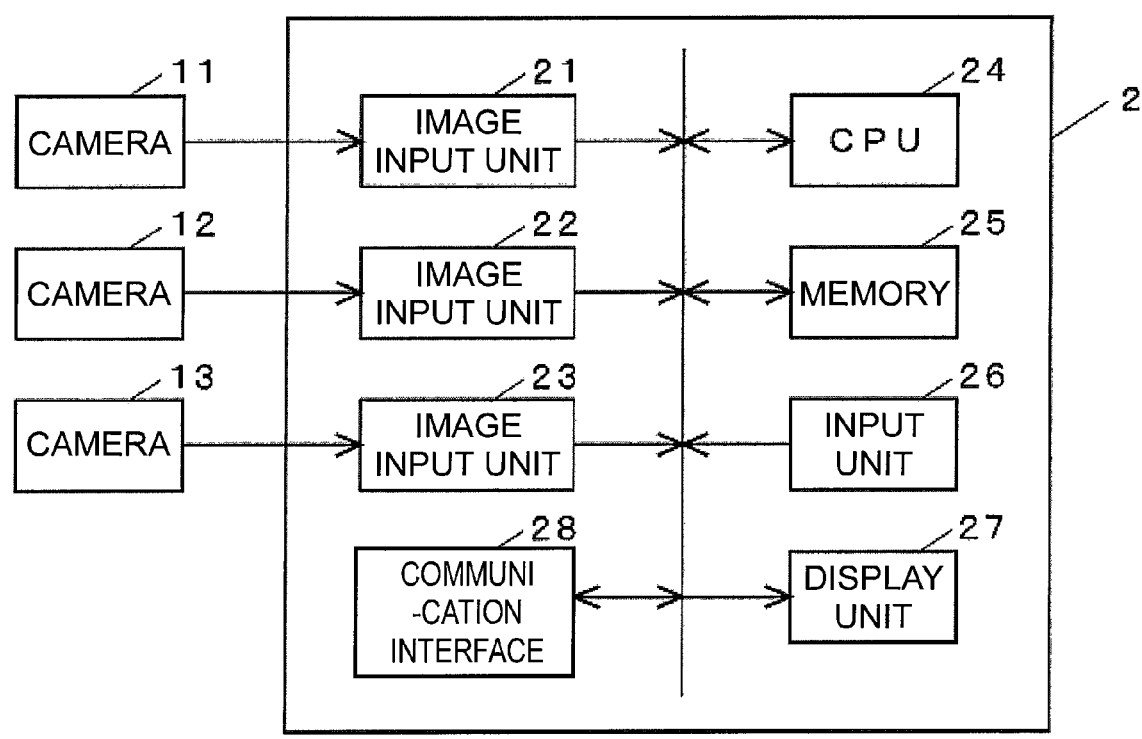
FIG. 2 is a block diagram of an object recognizing device.

FIG. 2 shows a hardware configuration of the object recognizing device 2.

This device includes, in addition to image input units 21, 22, 23 corresponding to each camera 11, 12, 13, a CPU 24, a memory 25, an input unit 26, a display unit 27, a communication interface 28, and the like. The input unit 26 is a keyboard or a mouse, and the display unit 27 is a liquid crystal monitor. The input unit 26 and the display unit 27 are used in applications where the user checks the imaging state of the actual model or performs a selecting operation or a setting operation when creating the three-dimensional model described below. The communication interface 28 is used to communicate with the robot control device 4.

The memory 25 includes a large capacity memory such as a ROM, RAM, and hard disk.

The CPU 24 executes a series of processes related to the three-dimensional measurement and the recognition of the work W based on a program stored in the memory 25, where the recognition result (specifically, three-dimensional coordinate representing the position of the work W, and rotation angle with respect to the three-dimensional model) is outputted by the communication interface 28.

The memory 25 also stores a program for creating the three-dimensional model. Prior to the recognition process, the CPU 24 creates the three-dimensional model of the work W using the image inputted from each camera 11 to 13 based on the relevant program, and registers the same in the memory 25.

Although not shown in FIG. 2, the object recognizing device 2 of the embodiment also includes a circuit for outputting a drive signal to each camera 11, 12, 13, where the CPU 24 is set with a function of controlling the imaging operation of each camera 11 to 13 through this circuit.

(2) Regarding Three-Dimensional Recognition Process

In the object recognizing device 2 described above, the three-dimensional information is restored for every unit called a "segment" and matching is performed with the three-dimensional model in units of segments after detecting an edge from the stereo image, similar to the invention described in Japanese Patent Publication No. 2961264. FIG. 3 shows a schematic procedure of a process executed to recognize one work through such a method. The three-dimensional recognition process in the present embodiment will be described below with reference to the step numbers of FIG. 3.

First, the stereo imaging by each camera 11 to 13 is performed, and an edge extraction filter is applied on each generated image to detect the edge in the image (ST1, ST2). The detected edge is then thinned (to data having width of one pixel), and the thinned edge is divided with feature points such as coupling points and branched points to generate segments of a line or a curved line (ST3, ST4). The segment extracted from the edge of the two-dimensional image is hereinafter referred to as "two-dimensional segment".

A process of corresponding the two-dimensional segments in correspondence relationship between images is then executed (ST5). In such correspondence, with one of the three images as a reference, each two-dimensional segment of the reference image is focused in order, and the corresponding two-dimensional segment is specified from the other two images for every focused two-dimensional segment. In other words, with respect to the focused two-dimensional segment, the two-dimensional segment which satisfies an epipolar condition and which connecting relationship with a nearby segment is aligned is detected from each image.

Then, a process of restoring the three-dimensional information from the correspondence relationship for every combination of the two-dimensional segment corresponded by the above-described process is executed (ST6).

Briefly describing, a three-dimensional coordinate of a certain pixel in the correspondence relationship between the segments is calculated for every combination of the corresponded two-dimensional segments. The distribution state of the calculated three-dimensional coordinate is matched with a linear and an arcuate model to determine whether the collection of three-dimensional coordinates corresponds to line/curve. According to such a process, the three-dimensional segment of a line or a curve that corresponds to the combination is specified for every combination of the two-dimensional segments.

Furthermore, in ST6, with respect to each three-dimensional segment, the respective segment is sampled for every interval set in advance to create information in which a type of segment (line or curve) and a three-dimensional coordinate of each sampling point are corresponded. Thus, more three-dimensional coordinates than the beginning can be obtained by making the sampling interval smaller even with respect to the three-dimensional segment in which the number of three-dimensional coordinates calculated from the two-dimensional segment is few.

The collection of three-dimensional segments restored through the above-described process corresponds to the three-dimensional information of the work to be recognized. In the next stage, the three-dimensional model is set at a predefined reference position of the three-dimensional coordinate system, and such a three-dimensional model and the restored three-dimensional information are matched to recognize the positional shift amount and the rotation angle of the work with respect to the three-dimensional model (ST7).

In the matching process of ST7, the coincidence degree of each three-dimensional segment of when correspondence is performed is calculated while corresponding each feature point in a best subset selection procedure with the intersection of each three-dimensional segment as a feature point, and the correspondence of when the coincidence degree is a maximum is specified as a correct correspondence relationship.

ST7 will be more specifically described. In this example, the amount of shift and the rotation angle necessary for moving the feature point on the three-dimensional model side to the correspondence point are calculated for every correspondence in correspondence to each feature point of the three-dimensional information of a matching target in order. The shift amount and the rotation angle are calculated for every axis of X, Y, and Z. All coordinates contained in the three-dimensional model are then transformed based on the calculated shift amount and the rotation angle, and the coincidence degree of the three-dimensional model after the transformation and the three-dimensional information to be matched is calculated.

The above processes are executed for all feature points on the three-dimensional model side, so that the feature points are corresponded in a round-robin method and the coincidence degree can be obtained for every correspondence. Then, the shift amount and the rotation angle used in the coordinate transformation of when the highest coincidence degree is obtained are ultimately recognized as the positional shift amount and the rotation angle with respect to the three-dimensional model of the work W to be recognized.

Thereafter, the recognized positional shift amount and the rotation angle are outputted to the robot control device 3 (ST8), and the process is terminated.

(3) Process of Creating Three-Dimensional Model 3-1) Description of Principles

To execute the three-dimensional recognition process described above, the three-dimensional model of the work W needs to be registered in the memory 25 in advance. In the object recognizing device of this embodiment, the three-dimensional model is created through a method of stereo measuring the work W from various directions and integrating the three-dimensional information restored from each measurement result. The work W used when creating the model is referred to as "actual model" of the work W. This process will be described in detail below. In the following figures, the actual model of the work W is denoted with a reference numeral WM, and the actual model WM is referred to as "work model WM" herein.

Figure 4A:
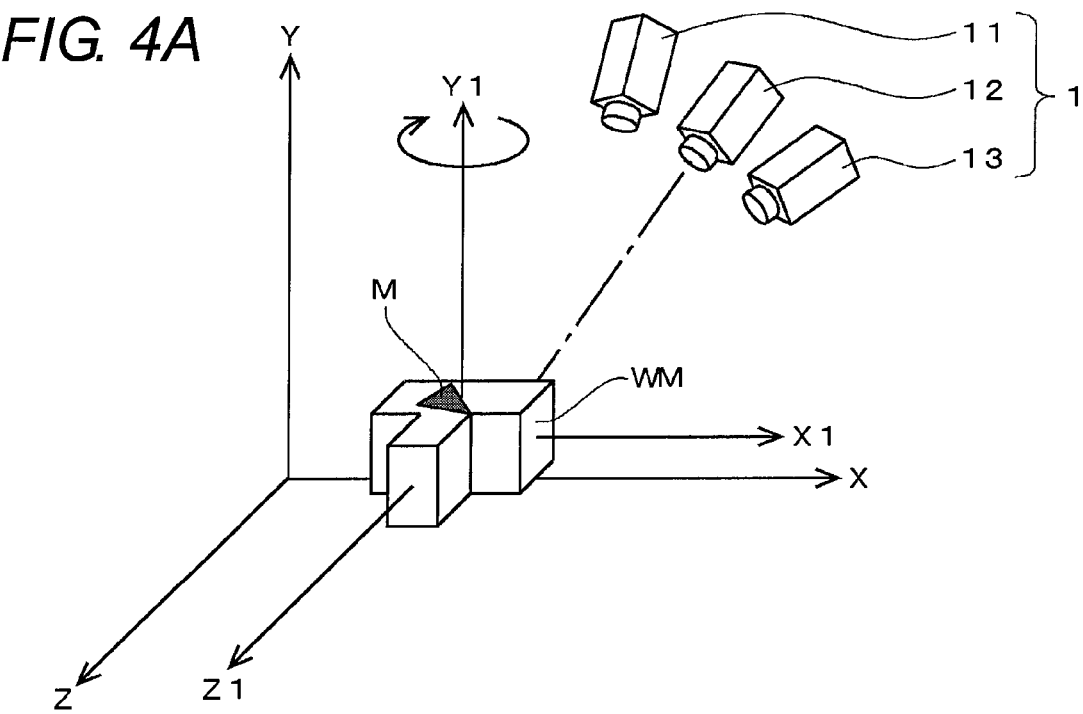
FIGS. 4A and 4B are views showing a measurement method of a work model.

In the present embodiment, as shown in FIG. 4A, the stereo measurement of a plurality of times is executed while changing the orientation of the work model WM with respect to the stereo camera 1 with the position and the optical axis direction of the stereo camera 1 fixed.

The three-dimensional coordinate system including each axis of X, Y, and Z in the figure is a coordinate system for calculation of the three-dimensional coordinate (hereinafter referred to as "measurement coordinate system"), and is uniquely defined with respect to the stereo camera 1. The three-dimensional coordinate system including each axis of X1, Y1, and Z1 is a coordinate system (hereinafter referred to as "work coordinate system") uniquely defined with respect to the work model WM. In FIG. 4A, each axis of X1, Y1 and Z1 is shown in a state parallel to the X, Y, and Z axes, but the direction of each axis of the work coordinate system accordingly changes when the orientation of the work model WM changes.

The orientation of the work model WM can be freely defined by the user, but in this embodiment, assuming a specific surface constantly lying along the X1Z1 plane is in contact with the work supporting surface (XZ plane in this example), the work model WM is rotated once with respect to the Y1 axis orthogonal to the XZ plane, and the imaging of a plurality of times is performed meanwhile. The rotation of the work model WM is performed through a method of changing the direction of the work model WM with the hand of the user without using the rotary table, and thus not only the rotation angle but the position of the work model WM with respect to the measurement coordinate system also shifts every time.

Figure 4B:
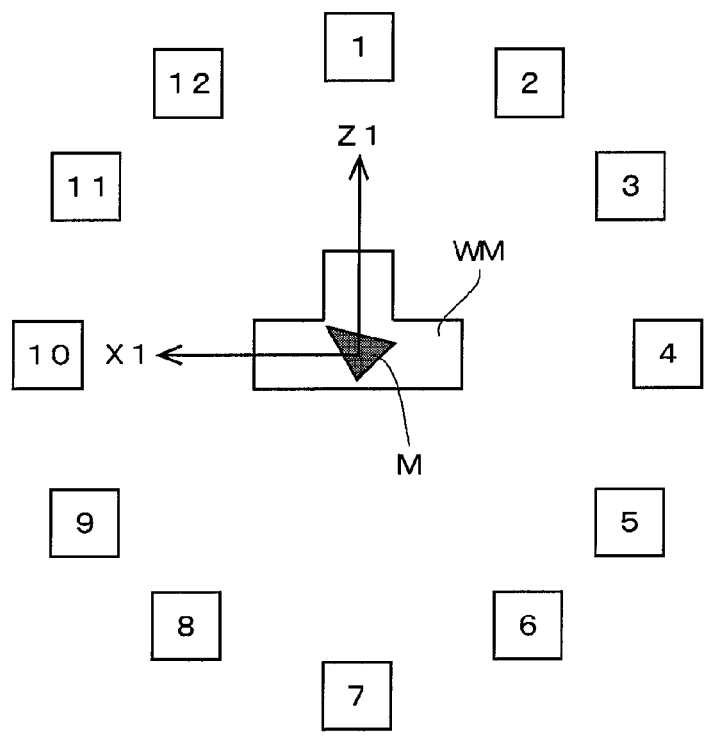

FIG. 4B shows a change in the positional relationship of the stereo camera 1 with respect to the work model WM with the work coordinate system as the reference. In the figure, rectangles with numbers 1 to 12 each indicate the location of the stereo camera 1 during imaging, and the numbers in the rectangle indicate the order of imaging. The stereo images generated by imaging at such positions are all targets of three-dimensional measurement. Thus, the position of the stereo camera represented by each rectangle is hereinafter referred to as "measurement point". When referring to each measurement point, the numbers representing the order of measurement such as "measurement point [1]" and "measurement point [2]" are cited.

In this embodiment, the processes similar to ST1 to ST6 of FIG. 3 are executed to restore the three-dimensional information for every 12 measurement points. At each measurement point excluding the measurement point [1], the three-dimensional information restored at the respective measurement points is matched with the three-dimensional information of the measurement point one before to recognize the positional shift amount and the rotation angle with respect to the three-dimensional information of one stage before. Such recognition process is performed through a method similar to the method performed in ST7 of FIG. 3.

With respect to the last measurement point [12], the positional shift amount and the rotation angle with respect to the three-dimensional information of the measurement point [1] are obtained in addition to the positional shift amount and the rotation angle with respect to the three-dimensional information of the measurement point [11]. Alternatively, the process may again proceed to the measurement point [1] from the measurement point [12] to re-execute the measurement, and the positional shift amount and the rotation angle with respect to the three-dimensional information of the measurement point [12] of the restored three-dimensional information may be obtained.

Furthermore, in this example, the accuracy of the three-dimensional information restored for every measurement point is checked, two or more pieces of three-dimensional information that are found to be satisfactory are selected, and the selected information are integrated after being aligned. The details of such processes will be described below.

In this example, a triangular mark M is then given to an appropriate area on the surface of the work model WM, and the stereo measurement is performed. The mark M is configured as a sticker, and is attached to a flat surface (central part on the upper surface in this embodiment) of the work model WM. Each measurement point is defined with a condition of obtaining a state in which the mark M is contained in the view of all cameras 11 to 13. Therefore, the three-dimensional information containing the three-dimensional segment representing each side of the mark M is restored at all measurement points.

Figure 5:
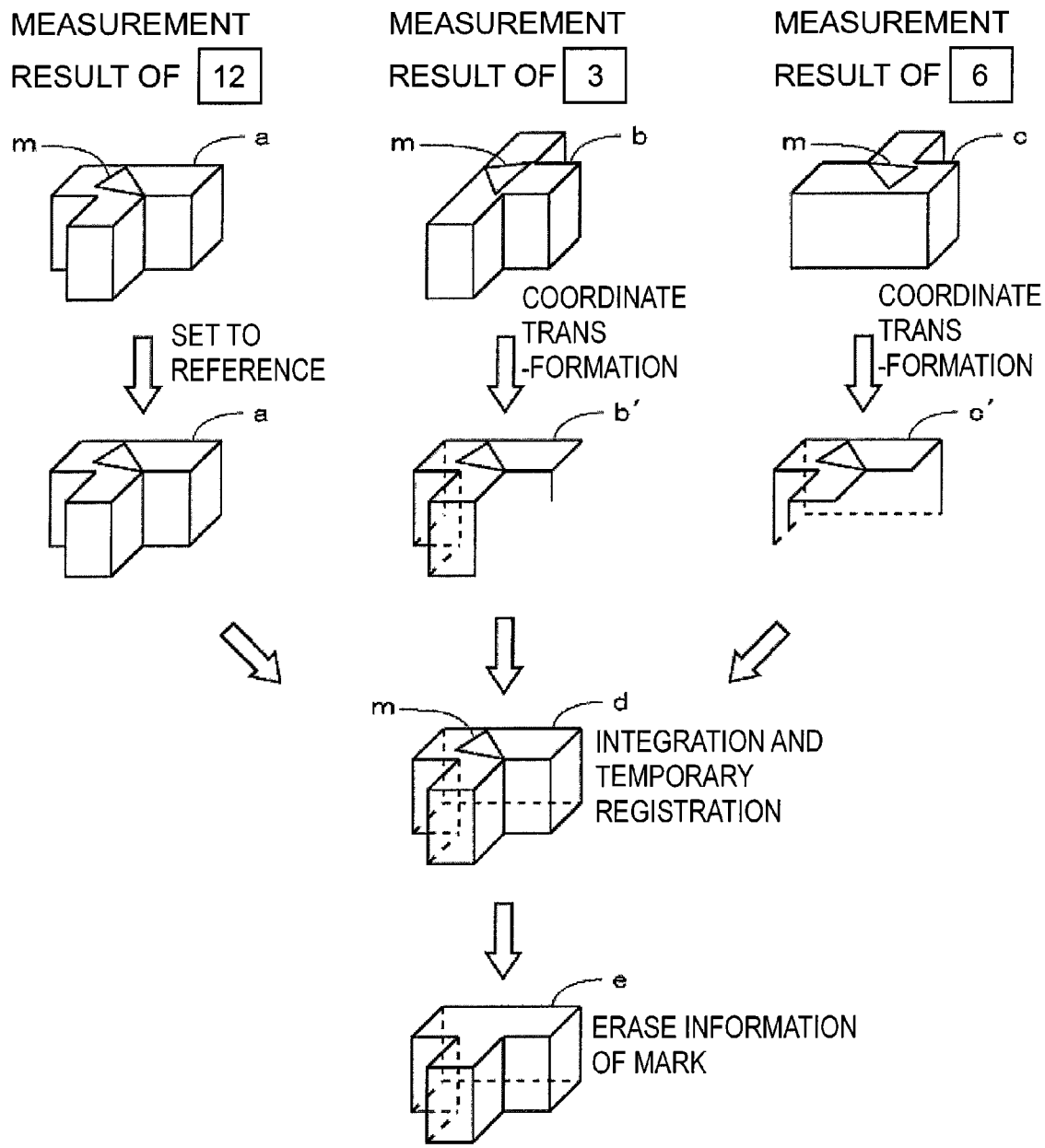
FIG. 5 is a view showing a schematic procedure of a process of creating a three-dimensional model.

FIG. 5 schematically shows a processing procedure of when creating the three-dimensional model using three pieces (indicated as a, b, and c in the figure) of the three-dimensional information restored at 12 measurement points for the work model WM attached with the mark M. Three-dimensional information a in the figure is restored at the measurement point [12] in FIG. 4B. Three-dimensional information b is restored at the measurement point [3], and three-dimensional information c is restored at the measurement point [6]. Information m of the mark M is also contained in all pieces of the three-dimensional information (it is to be noted that substantial content of the information m differs depending on the measurement point. This is the same for information m1, m2 to be hereinafter described).

In this example, with the three-dimensional information a as a reference, the other three-dimensional information b, c are coordinate transformed so as to resolve the positional shift and the angular shift with respect to the reference three-dimensional information a. Three-dimensional information d containing the features of the respective information is created by integrating the three-dimensional information b', c' after the transformation and the reference three-dimensional information a. Furthermore, three-dimensional information e representing only the three-dimensional shape of the work model WM is created by erasing the information m corresponding to the triangular mark M from the integrated three-dimensional information d, and this information e is set to the three-dimensional model.

The coordinate transformation process of the three-dimensional information is performed using the positional shift amount and the rotation angle previously obtained for every measurement point. For example, in order to align the three-dimensional information b restored at the measurement point

[3] to the three-dimensional information a restored at the measurement point [12], the coordinate transformation is performed using the positional shift amount and the rotation angle obtained for each combination of the measurement points [3] and [2], the measurement points [2] and [1], and the measurement points [1] and [12]. Similarly for the three-dimensional information c restored at the measurement point [6], the alignment to the three-dimensional information a is performed by executing the coordinate transformation using the positional shift amount and the rotation angle calculated in a range from the measurement point [6] to the measurement point [12] (in this case, either clockwise direction/counterclockwise direction).

As described above, when obtaining the positional shift amount and the rotation angle between the measurement points with a spacing, each measurement point in between is combined for every adjacent points to calculate the positional shift amount and the rotation angle of the three-dimensional information for every set of measurement points because matching the information containing common features as much as possible allows the accuracy of matching to be ensured. However, if the accuracy of the matching process can be sufficiently ensured by the function of the mark M described below, the three-dimensional information b, c may be directly matched with the three-dimensional information a to calculate the parameters necessary for the coordinate transformations process.

The reasons for attaching the triangular mark M to the work model WM will now be described.

Figure 6:
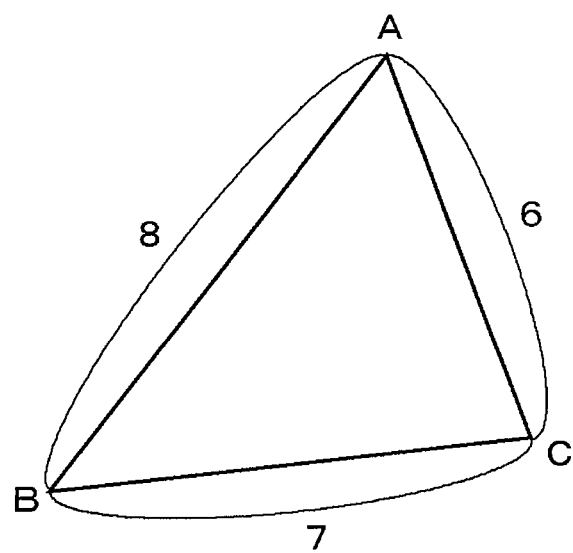
FIG. 6 is a view showing features of a triangle represented by a mark.

As shown in FIG. 6, a triangle represented by the mark M used in the embodiment is set such that the ratio of each side is 6:7:8. According to such a ratio, each vertex A, B, C of the mark M can be easily specified, and thus the direction of the mark M can be uniquely specified by the direction of a perpendicular line from the vertex A to the side BC, and the like. Furthermore, as shown in FIGS. 7A and 7B, the accuracy of alignment can be ensured when aligning with a triangle A'B'C' of the same shape.

Figure 7A:
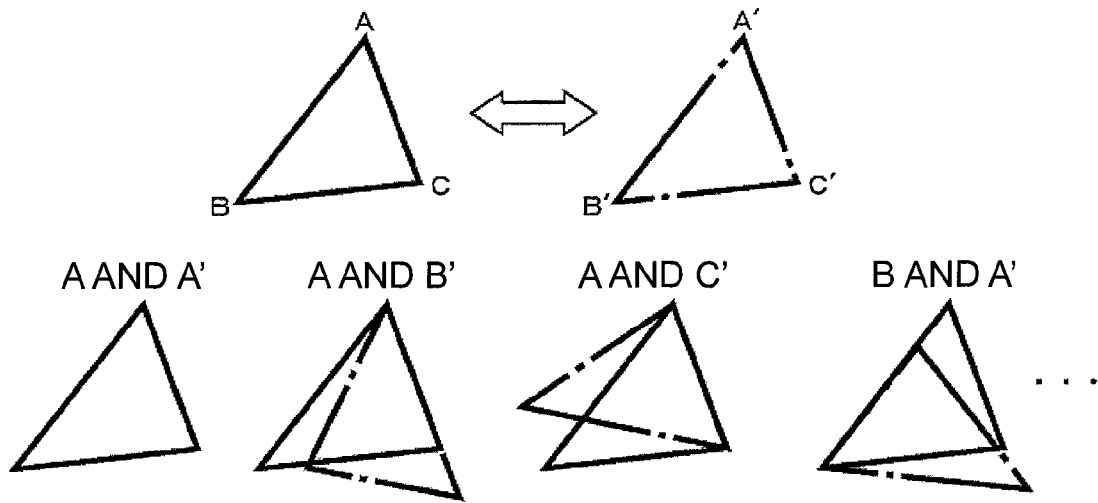
FIG. 7A is a view showing a correspondence state of a plurality of ways of each vertex of the triangle and FIG. 7B is a graph showing a coincidence degree.
Figure 7B:
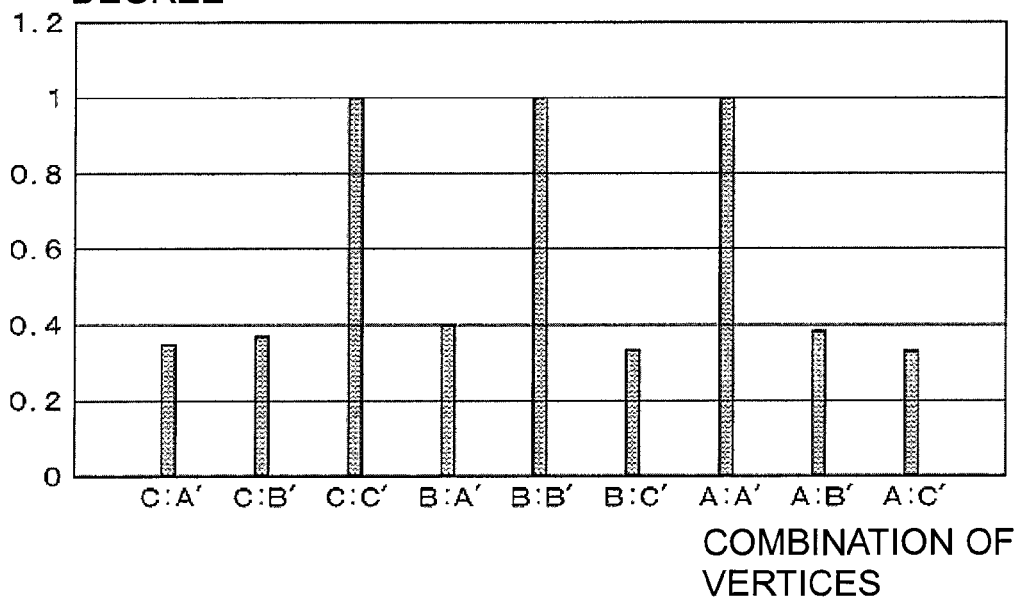

In FIG. 7A, the results of selecting a vertex one at a time from the triangle ABC having the above ratio and the triangle A'B'C' congruent thereto, and aligning each triangle with the selected vertex as a reference are shown. As shown in the figure, each triangle cannot completely overlap unless the vertices in correct correspondence relationship are combined.

In the correspondence of the triangles, the inventors actually obtained the coincidence degree of the entire triangle for every combination of vertices. FIG. 7B is a graph showing the results thereof. As shown in the graph, assuming the coincidence degree of when each vertex is correctly corresponded is one, the coincidence degree by other correspondence relationships becomes about 0.4 at a maximum. Therefore, it is recognized that right and wrong of the correspondence relationship of the triangle can be correctly determined.

As described above, according to the triangle having the shape shown in FIG. 6, a large difference is created in the coincidence degree for when each vertex of the triangle is correctly corresponded and when error is found in the correspondence. Since similar effects are to be obtained when performing correspondence with each side of the triangle as the three-dimensional segment, the coincidence degree related to the three-dimensional segment of each side of the triangle greatly influences the overall coincidence degree when the entire three-dimensional information containing the three-dimensional segment of the mark M are matched.

In other words, even if an element that causes misalignment exists in the original three-dimensional segment of the work model WM, if false correspondence is performed, the coincidence degree of the entire three-dimensional information lowers as the coincidence degree of the three-dimensional segment of the triangle greatly lowers. If each three-dimensional segment containing the three-dimensional segment of the triangle is correctly aligned, the coincidence degree becomes high in all three-dimensional segments, and thus the coincidence degree of the entire three-dimensional information also takes a high value. Thus, the coincidence degree of when correctly corresponded is made greater than other cases, and the accuracy of alignment can be ensured.

The shape of the triangle indicated by the mark M is not limited to the example of FIG. 6, and the ratio of the sides may be arbitrary as long as the above-described effects can be obtained. In addition, the shape is not limited to a triangle, and a mark having a polygonal shape with four or more vertices and which direction can be uniquely specified may also be created. Furthermore, the shape is not limited to a polygon, and a shape in which the sides of the polygon are curved or a cross in which the lengths of four line segments from the intersection all differ may also be adopted.

If the work model WM is non-transparent and the mark M cannot be seen from the side of the surface opposing the surface attached with the mark M, the mark M may be configured by a figure of line symmetric shape such as an isosceles triangle. In other words, it is assumed that a figure that does not have a rotation symmetric property can be used for the purpose of ensuring the accuracy of alignment of the entire three-dimensional information, which figure is designed such that a significant difference is created between the coincidence degree of when corresponded without positional shift and angular shift to the same figure and the coincidence degree in other correspondences.

The reasons for attaching the mark M to the flat surface will be described below.

If the mark M is attached to a curved surface, a possibility that each side of the triangle is also recognized as the three-dimensional segment becomes high, and the shape to be restored of the mark M fluctuates depending on the curvature of the curved surface. Therefore, when the mark M is attached to the curved surface, even if the three-dimensional information thereof is correctly restored, the restored three-dimensional information has a high possibility of representing a shape different from the original shape of the triangle, and thus the verification process of the three-dimensional information by matching with the model triangle described below becomes difficult to be performed stably.

The edge of each side of the mark M needs to be reliably detected to restore the three-dimensional information of the mark M with satisfactory accuracy. From such a standpoint, in the present embodiment, the surface of the mark M is colored with a substantially uniform color without being drawn patterns and the like, and two types of marks M corresponding to bright and dark of the color of the work are prepared, as shown in FIG. 8. In this manner, by changing the color of the mark M according to the color of the work that becomes the background, the contrast of the mark M and the background portion is enhanced and the detection accuracy of the edge is enhanced.

Figure 9:
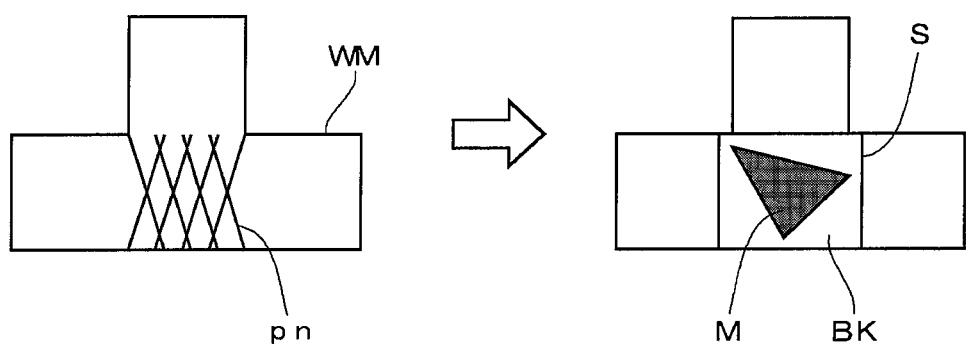
FIG. 9 is a view showing a mark for a work having a repetitive structure.

Furthermore, as shown in FIG. 9, if a pattern pn that may cause error in correspondence is provided at the surface of the work model WM, a sticker S in which a background BK and the mark M of uniform color are integrated is created, and such a sticker S is attached so as to hide the pattern pn.

3-2) Process Related to Ensuring Accuracy of Three-Dimensional Model

In the present embodiment, the following processes are executed to ensure the accuracy of the three-dimensional model.

(Complementary Process of Feature Point)

As shown in FIGS. 8 and 9, even if the mark M that takes into consideration the color and the pattern of the work model WM is attached, one part of the mark M becomes unclear due to the influence of shading and the like depending on the imaging direction, and the three-dimensional segment of the mark M may not be sufficiently restored due to the influence thereof. In particular, if the coordinate of the vertex that becomes the reference in matching of the three-dimensional information is missing, enhancing the accuracy of alignment by triangle may become difficult.

Figure 10A:
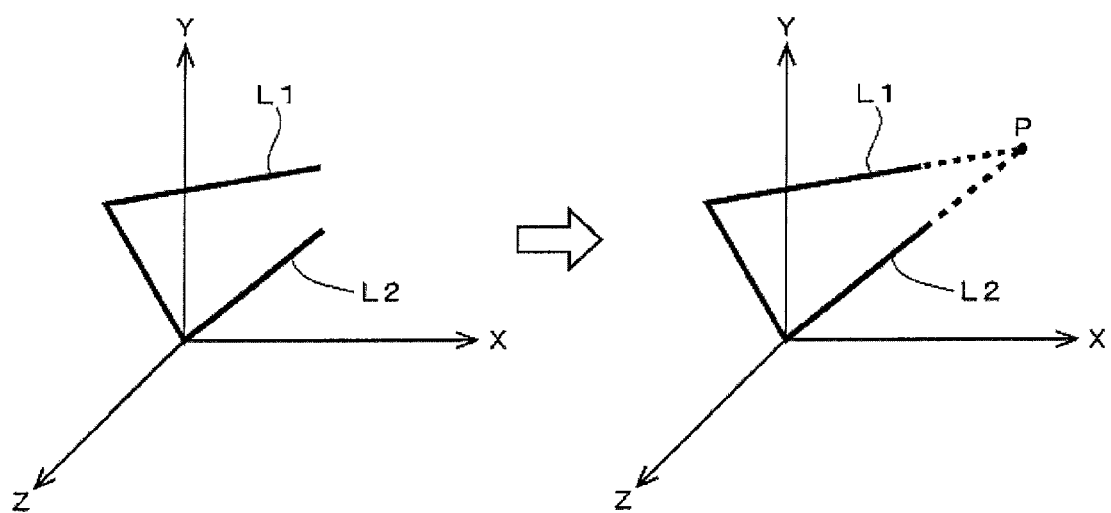
FIGS. 10A and 10B are views showing a complementary processing method of a feature point.
Figure 10B:
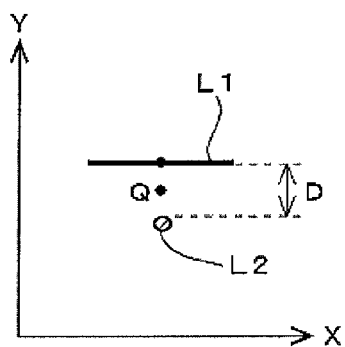

In view of the above problem, the three-dimensional coordinate corresponding to the disappeared vertex is complemented by performing a process shown in FIG. 10A with a linear segment of the restored three-dimensional segments as a target in the present embodiment. In FIGS. 10A and 10B, each three-dimensional segment is shown in an enlarged manner to clarify the processing content.

In the example of FIG. 10(A), with the linear segment having an end edge that is not coupled with another segment of the linear segments as the target, the end edge without coupling is extended in a range of up to a predetermined upper limit value. When the extended portion (e.g., extended portion of segment L1 in the figure) intersects another three-dimensional segment L2 or a portion similarly extended from the segment L2, the three-dimensional coordinate is calculated with such an intersection P as the feature point.

Taking into consideration the possibility that the segments to be coupled may cross without intersecting due to an error in measurement parameter and the like, specification of a feature point through a method shown in FIG. 10B is also performed. In this example, when two linear segments L1, L2 (both include extended portion) cross, a distance D between the segments L1, L2 at the relevant crossed area is calculated. If the distance D is within a predetermined threshold value, the three-dimensional coordinate is calculated assuming a midpoint Q between the segments as an intersection of the segments L1, L2. The upper limit value of the extended width of the linear segment and the threshold value to compare with the distance D between the segments are defined in advance based on the size of the mark M and the assumed measurement error.

According to the process of FIGS. 10A and 10B, the coordinate of the disappeared vertex of the triangle can be complemented even if the side or the vertex of one part of the triangle corresponding to the mark M disappears from the image, and thus the influence of the coincidence degree of the triangles on the coincidence degree of the entire three-dimensional information can be guaranteed. This is not limited to the vertex of the triangle, and even if the main feature point is not restored due to noise, measurement error, and the like, the coordinate thereof can be complemented and thus the accuracy in matching the three-dimensional information can be ensured.

(Verification of Three-Dimensional Information)

As described above, in the present embodiment, the work model WM is measured from various directions, but the three-dimensional information may not necessarily be restored with satisfactory accuracy at all measurement points. The accuracy of the three-dimensional information may degrade depending on the direction of the work model WM when the error of the measurement parameter is greatly reflected or the image containing numerous features that are easily falsely recognized is generated.

Furthermore, in the present embodiment, the position of the work model WM in the stereo measurement of each time is defined by the user, and thus the measurement is sometimes performed in a state the mark M is not included in the view of each camera due to the mistake of the user. In the three-dimensional information not containing the information of the mark M, the accuracy of alignment may possibility degrade, and thus such three-dimensional information needs to be excluded from the integrating target beforehand.

From such aspects, in the present embodiment, whether or not the three-dimensional information of the mark M is satisfactorily restored is determined for every measurement point, and the three-dimensional information determined to be satisfactory is used in the integration process.

Figure 11A:
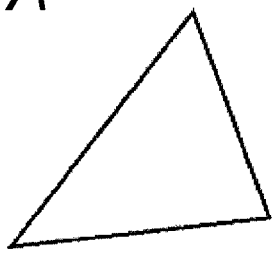
FIGS. 11A to 11C are views each showing an example of the three-dimensional information of a mark used in the selection of the three-dimensional information to be integrated.
Figure 11B:
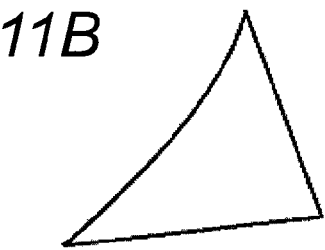
Figure 11C:
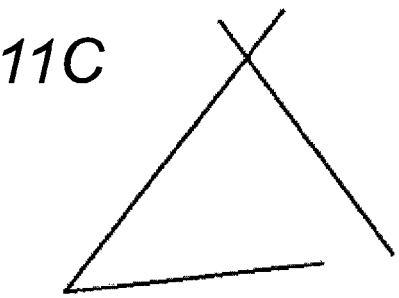

Specifically, in the determination process, when information close to the actual triangle is restored as in FIG. 11A, the entire three-dimensional information containing such information is determined as satisfactory to thereby become the target of integration. If the reproducibility of the triangle is not satisfactory such as when the side is curved as in FIG. 11B or when the vertex is not correctly restored as in FIG. 11C, the entire three-dimensional information is determined as not satisfactory, and is excluded from the target of integration.

Furthermore, in this embodiment, when determined that the three-dimensional information is not satisfactory, such three-dimensional information is discarded and the measurement is again performed or the measurement point is changed. If satisfactory three-dimensional information is not obtained even after the measurement is carried out over a predetermined number of times, the first setting process such as position adjustment of the stereo camera 1 and re-execution of the three-dimensional calibration is again carried out. According to such a process, the accuracy of the three-dimensional information used in the integration can be ensured, and the positional shift amount and the rotation angle necessary for the coordinate transformation in the integration are prevented from being calculated by the three-dimensional information having unsatisfactory accuracy, so that the accuracy of the three-dimensional model can be ensured.

The above-described determination process is specifically performed using the three-dimensional model data representing the geometric information of the mark M, specifically, the combination of data representing the preferred three-dimensional segments of the three sides of the triangle (such model data is hereinafter referred to as "model triangle"). In other words, the coincidence degree with respect to the model triangle is obtained by matching the three-dimensional information of each measurement point by the model triangle. This matching is also performed through a method similar to the matching by the three-dimensional model, that is, a method of corresponding each feature point of the model triangle to each feature point in the three-dimensional information by a round-robin method, and confirming the correspondence of when the coincidence degree with respect to the model triangle is the highest.

After performing such matching, the calculated coincidence degree is compared with a predetermined threshold value, where the three-dimensional information is determined as satisfactory if the coincidence degree is greater than the threshold value, and the three-dimensional information is deleted if the coincidence degree is smaller than or equal to the threshold value.

In this embodiment, instead of integrating all pieces of three-dimensional information determined as satisfactory, the three-dimensional information to be integrated is further selected therefrom. This selection is performed based on the judgment of the user at the time all measurement processes are completed.

FIG. 12 shows an example of a screen for selecting the three-dimensional information to use in the integration.

This screen includes a window 30 for displaying the three-dimensional information in a form of an image, and two select buttons 31, 32 indicating "add to model" and "not add". In the window 30, a contour line based on the three-dimensional information of the selection candidate is displayed, and a contour line M0 of the model triangle is displayed at the area determined as corresponding to the model triangle based on the previous matching result. The coincidence degree of the three-dimensional information with respect to the model triangle is also displayed in the window 30.

The user checks the display and when judging to add the three-dimensional information being displayed to the three-dimensional model, the user operates the "add to model" button 31. In this manner, the three-dimensional information being displayed is selected as the integrating target. If the "no add" button 32 is operated, the three-dimensional information being displayed is excluded from the integrating target. Note that the three-dimensional information is sometimes additionally registered to the three-dimensional model in an aim of enhancing the accuracy of the integrated three-dimensional information, as described below.

In the above description, the restoration accuracy of the three-dimensional information of the mark is automatically determined by comparing the coincidence degree with respect to the model triangle with the threshold value, but instead, a screen similar to FIG. 12 may be presented and the determination input of the user on whether or not the three-dimensional information of the mark is satisfactory may be accepted. The determination input and the selection on whether or not to add to the model may be accepted on the same screen.

(Suppress Capacity and Ensure Accuracy of Three-Dimensional Model)

In order to create the three-dimensional model that can be used in the recognition process from various measurement directions through the method shown in FIG. 5, the three-dimensional information at measurement points of as many as possible need to be selected and integrated. However, when the number of pieces of three-dimensional information to be integrated increases, the capacity of the three-dimensional model increases, and troubles may arise in the recognition process using such a three-dimensional model.

In view of such an aspect, in the present embodiment, the accuracy of the three-dimensional model is ensured while suppressing the capacity of the three-dimensional model through a method of integrating one part (two or more) of a plurality of pieces of three-dimensional information restored for every measurement point and creating a temporary three-dimensional model, and then adding lacking information to the temporary three-dimensional model.

FIG. 19 shows a specific example of a model creating process. The description will be made below with reference to the figure, where in the present embodiment, the three-dimensional information restored by the measurement at four areas of the measurement points [12], [3], [6], and [9] of the 12 measurement points are selected, aligned, and then integrated to create a temporary three-dimensional model. In this case as well, with the three-dimensional information of the measurement point [12] as a reference, the other three pieces of the three-dimensional information are coordinate transformed so as to align with the reference three-dimensional information, each piece of the three-dimensional information after the transformation and the reference three-dimensional information are integrated, and the information corresponding to the mark M is erased from the integrated three-dimensional information to obtain the temporary three-dimensional model, similar to the example of FIG. 5.

Then, the recognition process using the temporary three-dimensional model is executed with the three-dimensional information not used in the integration process, that is, the three-dimensional information of each measurement point of [1], [2], [4], [5], [7], [8], [10], and [11] as the target. Whether or not the recognized positional shift amount and the rotation angle are correct is determined, where the three-dimensional information determined as not correct is aligned and added to the three-dimensional model. In FIG. 19, an example of assuming the recognition process on the three-dimensional information of the measurement point [10] is not correctly performed and aligning and adding such three-dimensional information to the three-dimensional model is shown.

When recognizing the three-dimensional information not used in the integration process, the information of the mark is deleted from the three-dimensional information based on the result of matching using the model triangle above. Since the mark M is not attached to the actual work W to be recognized, the accuracy of the actual recognition process can be checked in the above manner. The information of the mark M is not added even when adding the three-dimensional information to the temporary three-dimensional model.

Next, when creating the temporary three-dimensional model, in the process of aligning each piece of three-dimensional information of the measurement points [3], [6], [9] to the reference three-dimensional information, the positional shift amount and the rotation angle with respect to the reference three-dimensional information (information of measurement point [12]) are specified from the positional shift amount and the rotation angle obtained for every measurement point and the coordinate transformation process using the same is performed, as described above.

The determination on the result of the recognition process using the temporary three-dimensional model and the coordinate transformation for aligning the three-dimensional information to be added to the three-dimensional model also become possible by specifying the positional shift amount and the rotation angle (specifically, positional shift amount and rotation angle corresponding to the reference three-dimensional information in the three-dimensional model) of the information to be processed with respect to the three-dimensional model through a method similar to the above.

Describing the three-dimensional information of the measurement point [10] by way of example, the positional shift amount and the rotation angle respectively recognized between the measurement points [10] and [11] and the measurement points [11] and [12] are cumulated, so that the positional shift amount and the rotation angle with respect to the temporary three-dimensional model of the three-dimensional information can be specified. The specified positional shift amount and the rotation angle are compared with the positional shift amount and the rotation angle obtained through direct matching with the three-dimensional model, where determination is made that the result of the recognition process by the three-dimensional model is not correct if a difference exceeding an acceptable value is found between them. The alignment to the three-dimensional model is made by performing coordinate transformation on the three-dimensional information of the measurement point [10] using the positional shift amount and the rotation angle specified from the matching result for every measurement point.

In this embodiment, the measurement direction of each time is arbitrarily set, but a direction extremely different from the measurement direction immediately before is not set according to each illustrated measurement point, and thus the possibility that the three-dimensional information containing great amount of features common to the three-dimensional information by the measurement immediately before is restored is high at all measurement points.

Therefore, at each measurement point, the positional shift amount and the rotation angle with respect to the three-dimensional information of the measurement point one stage before can be accurately obtained, and hence whether or not the recognition result by the temporary three-dimensional model is correct can be easily determined based on the positional shift amount and the rotation angle having satisfactory accuracy. Similarly for the three-dimensional information where the positional shift amount and the rotation angle are not correctly recognized through the direct matching by the temporary three-dimensional model, the positional shift amount and the rotation angle with respect to the three-dimensional model are specified based on the matching result associated with each measurement performed between the measurement corresponding to the three-dimensional information and the measurement corresponding to the reference three-dimensional information in the three-dimensional model, and the coordinate transformation for aligning with the temporary three-dimensional model is performed with satisfactory accuracy with such positional shift amount and rotation angle as parameters.

3-3) Procedure of Creating and Registering Process of Three-Dimensional Model

Figure 13:
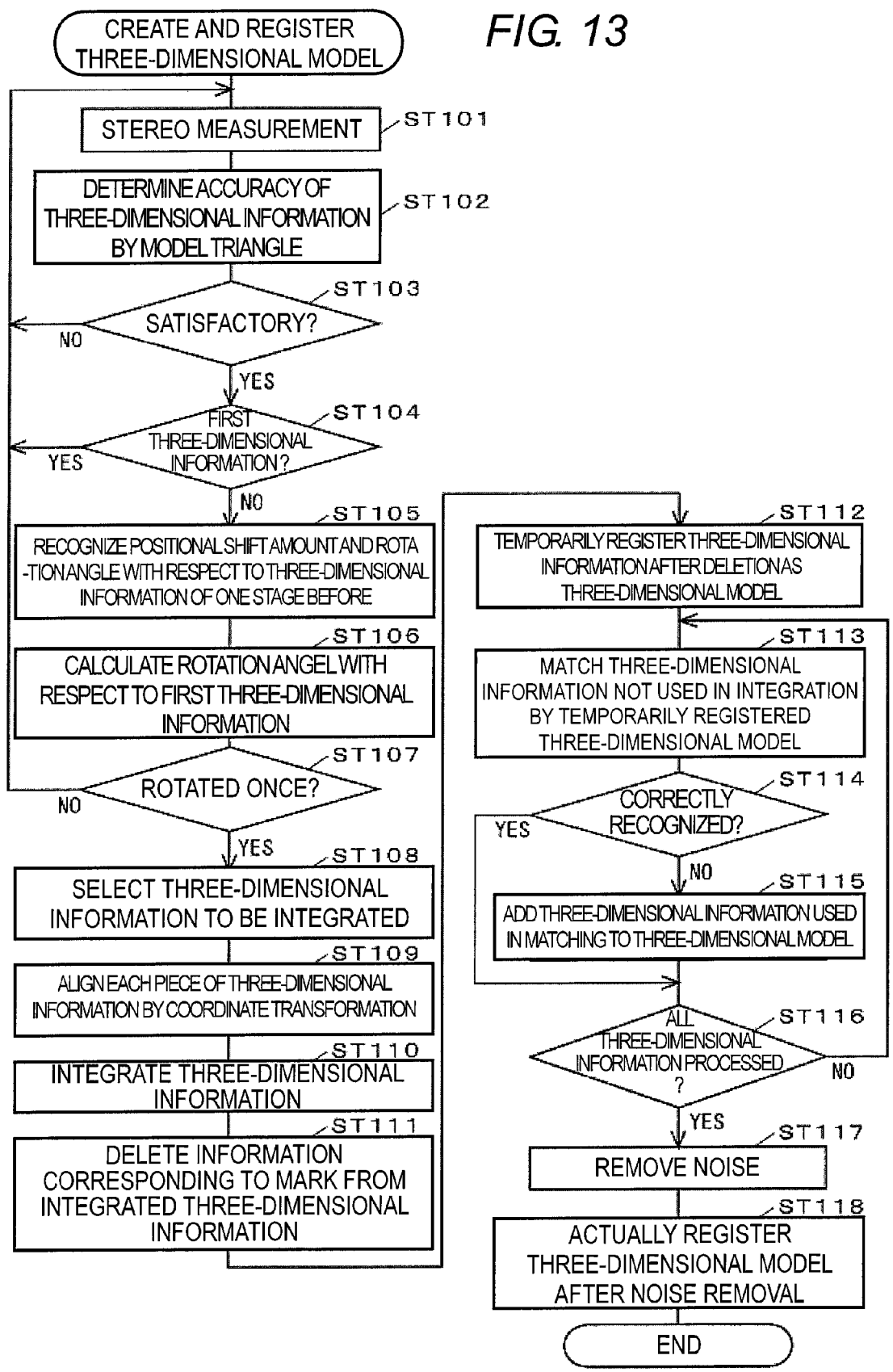
FIG. 13 is a flowchart showing the procedure related to creation and registration of the three-dimensional model.

FIG. 13 summarizes a procedure of a process from when the stereo measurement is performed until the three-dimensional model is registered in a flowchart. The procedure for creating the three-dimensional model of the present embodiment will be described below along the flow of the flowchart.

In this embodiment, since the positioning of the work model at the time of measurement is left up to the discretion of the user, a preview image from each camera 11 to 13 is displayed on the display unit 27 during the measurement process. After the user checks whether the work model WM is being correctly imaged by each camera 11 to 13 on the display screen and performs the operation to instruct measurement, the "stereo measurement" step (ST101) in FIG. 13 is executed. In step ST101, the process from the stereo imaging to the restoration of the three-dimensional information (similar to ST1 to ST6 of FIG. 3) is specifically executed.

The restored three-dimensional information is then matched by the model triangle to determine the accuracy of the three-dimensional information (ST102). The determination here can be performed using a method of accepting the automatic determination based on the coincidence degree or the determination of the user on the display screen of the matching result, as described above.

If determined that the three-dimensional information is not satisfactory ("NO" in ST103), the restored three-dimensional information is erased, and an error message and the like is displayed on the display unit 27. In response thereto, the user again makes a measurement instruction by changing the position of the work model WM, and the like.

If determined that the restored three-dimensional information is satisfactory ("YES" in ST103), the positional shift and the rotation angle with respect to the three-dimensional information of one stage before of this three-dimensional information are recognized (ST105). Furthermore, with respect to the rotation angle, the rotation angle with respect to the first restored three-dimensional information is calculated through a method of adding the recognized value every time (ST106). However, each step of ST105 and ST106 is skipped when the three-dimensional information is restored for the first time ("YES" in ST104).

In this embodiment, determination is made that the work model WM has rotated once with respect to the stereo camera when the rotation angle with respect to the first three-dimensional information exceeds 360 degrees (ST107). The processes of ST101 to ST107 are repeated until it is determined that the work model WM has rotated once.

When determined that the work model WM has rotated once with respect to the first three-dimensional information, the loop of ST101 to ST107 is terminated, the screen shown in FIG. 12 is displayed, and the selection of the three-dimensional information to be integrated is accepted (ST108). With one piece of the selected three-dimensional information as a reference, other pieces of the three-dimensional information are aligned with the reference three-dimensional information (ST109), and each piece of the aligned three-dimensional information are integrated (ST110).

The process of selecting the three-dimensional information to be integrated may be automatically performed without depending on the user. For example, the three-dimensional information restored in the measurement of when the work model WM is rotated by greater than or equal to a constant angle can be selected as the integrating target based on the rotation angle recognized in ST106 involved in the measurement of each time.

Figure 14:
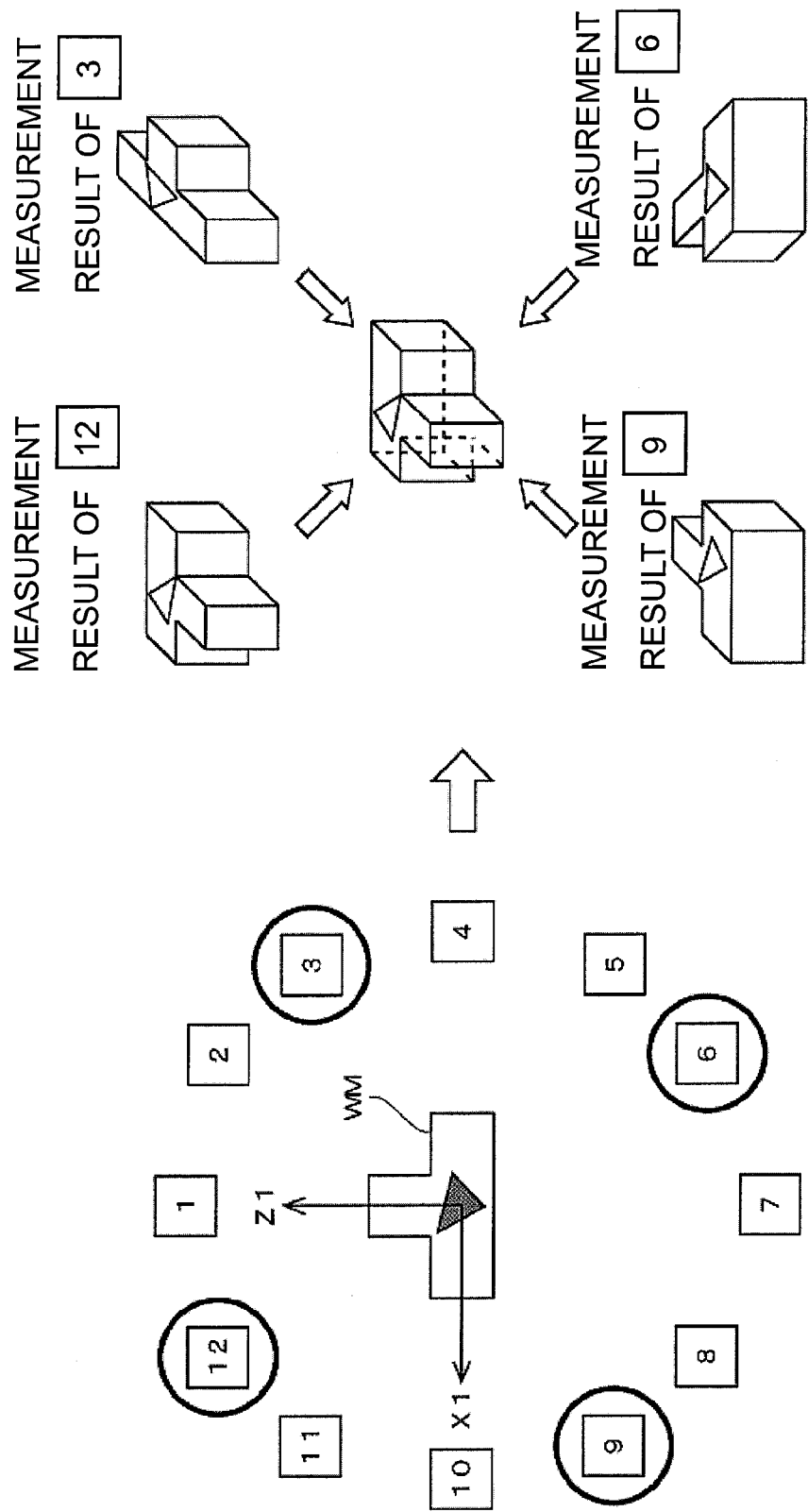
FIG. 14 is a view showing a selection example of the three-dimensional information of the integrating target.

FIG. 14 schematically shows an example of selecting four measurement points 3, 6, 9, 12 from the 12 measurement points and performing integration. A balanced three-dimensional model can be created by selecting the measurement direction of the integrating target taking into consideration not to deviate to a specific range from the entire range surrounding the work model WM, as in this example.

After the integration process is terminated, information corresponding to the mark M is deleted from the integrated three-dimensional information (ST111). This is because since the mark M is not attached to the actual work W to be recognized, the matching accuracy may lower if the information of the mark M remains contained in the three-dimensional model. In this case, however, the information of the mark M may not be deleted, and may be just invalidated so as not to become the matching target.

As shown in FIG. 14, even if the three-dimensional information of the integrating target is selected taking into consideration not to deviate to those by the measurement of a specific range, the orientation of the work model WM may just be changed and recognition by the integrated three-dimensional information may not be possible depending on the shape of the work model WM. In view of such an aspect, in the present embodiment, the accuracy of the three-dimensional model may be further enhanced through the following processes after temporarily registering the three-dimensional information, from which the information of the mark M is deleted, as the three-dimensional model (ST112).

Specifically, the three-dimensional information not selected as the integrating target by the temporarily registered three-dimensional model is matched in order, the positional shift amount and the rotation angle with respect to the three-dimensional model are calculated, and such calculated values are compared with the values derived from the positional shift amount and the rotation angle obtained previously for every measurement point to determine whether or not correct recognition is performed (ST113, ST114). If determined that the three-dimensional information to be matched is not correctly recognized ("NO" in ST114), the three-dimensional information used in the matching is aligned to the three-dimensional model, and added to the three-dimensional model (ST115). If determined that the three-dimensional information to be matched is correctly recognized ("YES" in ST114), the process proceeds without adding the three-dimensional information to the three-dimensional model. The above alignment is performed through coordinate transformation based on the positional shift amount and the rotation angle obtained for every measurement point.

Therefore, with the three-dimensional information excluded from the integration as the target in order, whether or not such three-dimensional information can be correctly recognized by the integrated information is determined, and the three-dimensional information, where determination is made that error has occurred in the recognition, is added to the three-dimensional model. According to the above process, similar false recognition no longer occurs with the subsequent three-dimensional model and the accuracy of the three-dimensional model can be enhanced since the temporarily registered three-dimensional model is added with the three-dimensional information not recognized in such a model. Furthermore, since the correctly recognized three-dimensional information is not added to the three-dimensional model, the amount of data of the three-dimensional model is prevented from increasing.

Thereafter, the process of removing noise is executed (ST117) to further enhance the accuracy of the three-dimensional model. For example, the three-dimensional segment which length is smaller than or equal to a predetermined threshold value and the three-dimensional segment which number of sampling points of the three-dimensional coordinate is smaller than or equal to a predetermined number in the three-dimensional segments configuring the three-dimensional model are deleted. The three-dimensional segment corresponding to the shade is detected from the distribution state of the three-dimensional coordinate of the XZ plane, and deleted. In addition, the extended portion of the linear segment is checked whether or not there is an area exceeding the set upper limit value, and the extended area exceeding the upper limit value is deleted with the set intersection.

Thus, false correspondence in the matching process is prevented by deleting the short three-dimensional segment, the three-dimensional segment with few number of sampling points, the three-dimensional segment representing shade, the three-dimensional segment with false extension, and the like. In addition, since the capacity of the three-dimensional model is reduced, the time of the checking process can be reduced.

After the noise is removed, the three-dimensional model after the noise removal is actually registered (ST118) and the process is terminated.

According to the above process, the positional shift amount and the rotation angle with respect to the three-dimensional information obtained immediately before is accurately obtained by matching the three-dimensional information containing the information of the triangular mark M every hour while changing the relationship between the work model WM and the stereo camera 1 little by little, and thus the accuracy of alignment at the time of the integration process can be ensured. Therefore, the three-dimensional model having satisfactory accuracy can be created by the three-dimensional information restored by measurements from various directions.

Furthermore, according to the above example, although the stereo imaging needs to be performed with the same mark M included in the view of each camera 11 to 13, the accuracy of alignment can be ensured by the effect of the mark M. Furthermore, equipment such as a rotary table is unnecessary since the rotation angle of the work model WM does not need to be strictly adjusted. Moreover, the load of the user can be alleviated since the three-dimensional model having satisfactory accuracy can be created by moving the work model WM by an appropriate angle.

The correctness of the recognition process by the three-dimensional model has been automatically determined in the above embodiment, but the present invention is not limited thereto, and the check screen shown in FIG. 20 may be displayed to accept the determination of the user.

The screen includes a window 30 for displaying the three-dimensional information in a form of an image, and two select buttons 31, 32 indicating "add model" and "next". In the window 30, the contour line representing the three-dimensional information restored by the measurement and the contour line representing the three-dimensional model are displayed in different colors (indicated with different line thickness in the figure). Note that a part corresponding to the mark M is deleted from the contour line representing the restored three-dimensional information.

The contour line (heavier line) representing the three-dimensional model shows an image in which the temporary three-dimensional model at the current time point is coordinate transformed according to the positional shift amount and the rotation angle recognized by matching with the three-dimensional information. The coincidence degree of the three-dimensional information with respect to the three-dimensional model is also displayed in the window 30.

The user judges whether or not the three-dimensional information being displayed is correctly recognized from the relationship of the contour lines and the display of the coincidence degree, and operates the "add model" button 31 if judged as not correctly recognized. After such an operation is performed, the coordinate transformation for aligning the three-dimensional information being displayed to the temporary three-dimensional model is performed, and the process of adding the three-dimensional information after the transformation to the temporary three-dimensional model is performed.

If judged that the three-dimensional information being displayed is correctly recognized, the user operates the "next" button 32. When such an operation is performed, the updating process of the three-dimensional model is not performed, and the check screen of the next three-dimensional information is displayed.

Therefore, according to the method in which the user visually judges the correctness of the recognition result by the temporary three-dimensional model, even if the calculated coincidence degree is not satisfactory, a flexible measure can be taken such as judging that correct recognition is made if a recognition result that does not cause problems in the control of the robot 4 is obtained. Thus, the capacity of the three-dimensional model can be further reduced.

The above-described check screen is not limited to the application of checking the three-dimensional information to add to the three-dimensional model, and may be used for the purpose of checking the accuracy of the matching process (ST105 of FIG. 13) of the three-dimensional information restored in the stereo measurement performed every time and the three-dimensional information of one stage before. For example, the second and subsequent stereo measurements are executed, and every time the three-dimensional information restored by measurement is matched with the three-dimensional information of one stage before, the check screen showing the matching result is displayed to cause the user to make a determination input on the appropriateness of the matching result. The next stereo measurement is performed when the determination result notifying that the recognition result of the positional shift amount and the rotation angle with respect to the three-dimensional information of one stage before is correct is inputted, and the measurement result is discarded when the determination result notifying that the recognition result is not correct is inputted. When determining that the recognition result is not correct, the user changes the measurement direction in the direction of approaching the measurement direction of one stage before after inputting the determination result, and again performs the stereo measurement. In this manner, the accuracy of the correspondence relationship between the three-dimensional information restored by the stereo measurement of every time is guaranteed, and hence the accuracy of the process of aligning the three-dimensional information to be added to the temporary three-dimensional model can be enhanced.

3-4) Other Methods Related to Creating Three-Dimensional Model

In the above-described embodiment, the three-dimensional model is created after executing all stereo measurements, but the present invention is not limited thereto, and the three-dimensional model may be created in parallel to each stereo measurement.

A specific description will be given below. In this case as well, the measurement is executed with the work model WM rotated by an arbitrary angle with respect to the Y1 axis every time, but the three-dimensional information restored by the measurement of first time is initially set as the temporary three-dimensional model. In the subsequent measurements, the positional shift amount and the rotation angle of the three-dimensional information restored by the relevant measurements with respect to the three-dimensional information of one stage before are obtained, the recognition process by the temporary three-dimensional model is executed, and whether or not the recognition result is correct is determined. If determined that the result of the recognition process is not correct, the three-dimensional information being processed is coordinate transformed so as to align to the temporary three-dimensional model, and the three-dimensional information after the transformation is added to the temporary model.

In this method as well, the coordinate transformation process is executed based on the positional shift amount and the rotation angle with respect to the three-dimensional information of one stage before obtained in the measurement of each time with respect to the three-dimensional information that is not correctly recognized, and the three-dimensional information after the transformation is added to the temporary three-dimensional model. Therefore, if the accuracy of matching with respect to the three-dimensional information of one stage before is ensured by adjusting the fluctuation range in the measurement direction so that the information contained in the three-dimensional information of one stage before is restored considerably overlapping in each measurement, the three-dimensional information to be added can be accurately aligned to the temporary three-dimensional model. Similar to the embodiments above, the determination of the recognition result may be automatically made using the positional shift amount and the rotation angle obtained for every measurement, or the determination input from the user may be accepted using the check screen having a configuration similar to FIG. 20.

A method in which the above-described embodiments and the embodiment shown in 3-2) are compromised may be adopted. For example, the stereo measurement of an appropriate number of times is first executed with the measurement direction of every hour changed, and the temporary three-dimensional model is created from the three-dimensional information restored from the measurements. Thereafter, the process of setting the measurement direction not corresponding to the temporary three-dimensional model and performing the stereo measurement is repeated over a plurality of times, and the restored three-dimensional information is recognized by the temporary three-dimensional model for every measurement. The three-dimensional information, in which the result of the recognition process is determined as not correct, is then aligned and added to the temporary three-dimensional model, and the three-dimensional model of when all the measurements are terminated is actually registered.

When adopting the above method as well, the three-dimensional information restored by the measurement is matched with the three-dimensional information restored one stage before for every measurement, the positional shift amount and the rotation angle are both calculated, the coordinate transformation process on the three-dimensional information that is not correctly recognized is executed using such calculation results, and the three-dimensional information after the transformation is added to the three-dimensional model.

In this method, however, the three-dimensional information that can be correctly recognized by the temporary three-dimensional model needs to be restored in the first measurement after the temporary three-dimensional model is created (e.g., the measurement direction is set within a predetermined angle range from the measurement direction corresponding to one of the plurality of pieces of three-dimensional information integrated in the temporary three-dimensional model, or subsequent processes are performed after the user checks the correctness of the result of the recognition process with respect to the first measurement after the temporary three-dimensional model is created). This is because the correspondence relationship between the three-dimensional information restored by subsequent measurements and the temporary three-dimensional model cannot be specified if the correspondence relationship between the three-dimensional information restored by the first measurement and the temporary three-dimensional model cannot be specified. In the subsequent measurements, the fluctuation range in the measurement direction needs to be taken into consideration so that the accuracy of matching with respect to the three-dimensional information of one stage before can be ensured.

An example in which the calculation process is more simplified will be described below.

In this example as well, the three-dimensional information restored by the three-dimensional measurement of the first time is initially set as the temporary three-dimensional model, and then, information is added to the temporary three-dimensional model in parallel to the proceeding of the subsequent measurements. In this embodiment, however, the work model WM without the mark M is used, and the process of matching with the three-dimensional information of one stage before for every measurement point and obtaining the positional shift amount and the rotation angle is not performed. Thus, in the present embodiment, the correctness of the recognition result by the temporary three-dimensional model is not automatically determined, but rather, the recognition result is visually judged by the user and the input of the judgment result is accepted.

The check and the determination of the recognition result are performed with the check screen similar to that shown in FIG. 20. Specifically, when the user judges that the three-dimensional information being displayed is not correctly recognized and operates the "add model" button 31, the display screen changes to the guidance screen for performing the update process of the three-dimensional model to be described below. The three-dimensional model is updated to the model added with new information when the user proceeds the measurement according to the instruction of the relevant screen.

When judged that the three-dimensional information being displayed is correctly recognized, the user operates the "next" button 32. When such an operation is performed, the update process of the three-dimensional model is not performed, and the next measurement is performed.

Furthermore, the check screen in this case includes a select button for instructing re-measurement when judged that the restored three-dimensional information is not satisfactory. When such a button is operated, the restored three-dimensional information is discarded and the measurement is again performed.

Figure 21:
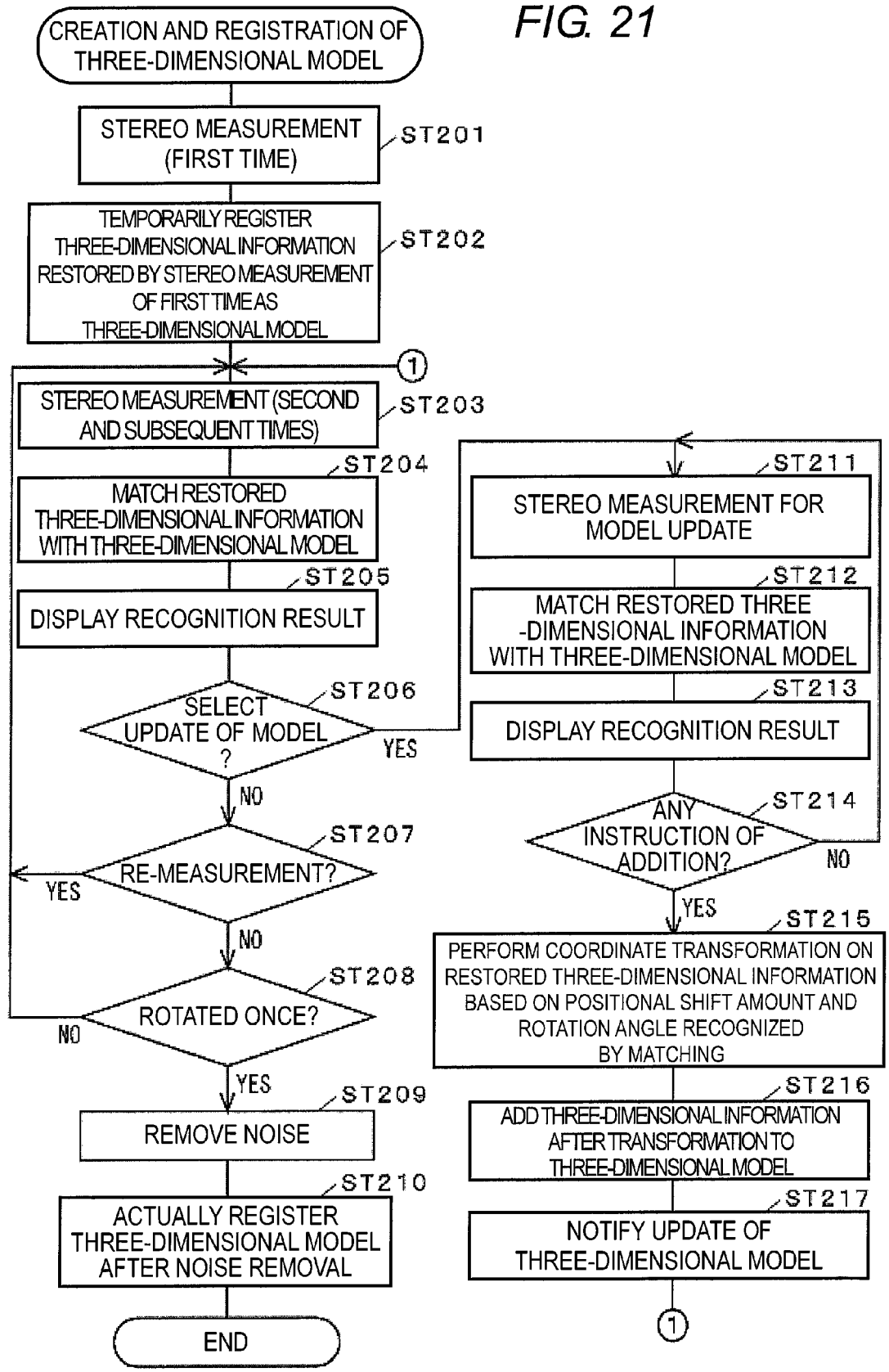
FIG. 21 is a flowchart showing another example of a procedure related to creation and registration of the three-dimensional model.

FIG. 21 is a flowchart of when creating and registering the three-dimensional model through the above method. The method of creating the three-dimensional model according to such an embodiment will be described in detail below with reference to the step numbers of the flowchart.

The processes by such a flowchart are also based on the assumption that the process of performing the three-dimensional measurement by rotating the work model WM by an arbitrary angle with respect to the Y1 axis is executed until the work model WM is rotated once. Except for when executing the update process of the three-dimensional model, the rotating direction of the work model WM is assumed to be constant (this rotating direction is hereinafter referred to as "positive rotating direction").

First, the first stereo measurement is executed (ST201). In step ST201 as well, the process corresponding to ST1 to ST6 of FIG. 3 is executed. The three-dimensional information restored by the first measurement is temporarily registered as the three-dimensional model (ST202).

Thereafter, the work model WM is rotated by an arbitrary angle to execute the next stereo measurement (ST203). The three-dimensional information restored by the stereo measurement is then matched by the temporary three-dimensional model, and the recognition result by such matching is displayed (ST204, ST205).

The user checks whether the three-dimensional information is correctly restored or whether the recognition by the three-dimensional model is correctly performed with the display screen. If the user judges that both processes are correctly performed and inputs the judgment results thereof, whether or not the work model WM has rotated once from the recognized rotation angle is determined (ST208). If determined that the work model WM has not rotated once ("YES" in ST208), the process returns to ST203.

In this case, the next stereo measurement is executed with the work model WM further rotated in the positive rotating direction.

If the user judges that the three-dimensional information is not correctly restored and inputs the judgment result thereof ("YES" in ST207), the process returns to ST203 without checking whether or not the work model WM has rotated once. In this case, the three-dimensional information restored by the stereo measurement immediately before is discarded, and the next stereo measurement is carried out.

If the user judges that the recognition result of the three-dimensional information is not correct and inputs the judgment result thereof ("YES" in ST206), the process proceeds to the stereo measurement for model update (ST211). In this case, the display of the display unit 27 is changed to the guidance screen, the work model WM is rotated in the opposite rotating direction (negative direction), and a notification to approach to the measurement state of one before is instructed.

When the stereo measurement for model update is performed, the three-dimensional information restored by such measurement is matched with the three-dimensional model, and the recognition result by such matching is displayed (ST212, ST213). In the display screen of this case as well, the recognized relationship of the three-dimensional information and the three-dimensional model is displayed, similar to the example of FIG. 20. For the select button, there are provided a button for selecting to add the displayed three-dimensional information to the three-dimensional model, and a button for selecting not to add.

If the user selects "not add" ("NO" in ST214), the stereo measurement for model update (ST211) is again executed, and the steps of ST212, ST213 are executed accompanied therewith. Note that the stereo measurement of this case is not limited to rotating the work model WM in the negative direction and may rotate the work model WM in the positive direction (e.g., when the rotation in the negative direction of the work model WM in the previous measurement is too large).

If the user selects to add the displayed three-dimensional information to the three-dimensional model ("YES" in ST214), the three-dimensional information restored by the stereo measurement for model update is coordinate transformed based on the positional shift amount and the rotation angle recognized by the matching with the three-dimensional model (ST215). The three-dimensional information after the transformation is then added to the three-dimensional model (ST216).

When the three-dimensional model is updated by such a process, a process of notifying the user that the update has been performed is executed (ST217). In the screen of this stage, the three-dimensional model is updated, and furthermore, the rotating direction of the work model WM is returned to the positive direction and a guidance urging to again set the vicinity of the measurement direction of when correct recognition is not made is displayed.

Subsequently, the process returns to the stereo measurement of ST203, and ST204, ST205 are further executed with such a measurement process.

If the user changes the orientation of each time of the work WM according to the displayed instruction, the three-dimensional information related to the feature contained in the three-dimensional information of when misrecognition is made the previous time is added to the three-dimensional model, and the recognition accuracy with respect to the measurement direction in which misrecognition is made is enhanced, and thus the possibility of obtaining a correct recognition result is assumed to be high at this stage. Even if judged again that the recognition result is not correct, the work model WM can again be rotated in the negative direction to update the model to thereby further enhance the recognition accuracy.

Similarly, the process of performing the stereo measurement by rotating the work model WM at an arbitrary angle is repeated, the restored three-dimensional information is matched with the three-dimensional model for every measurement, and the correctness of the recognition result by such matching is judged by the user. If the user judges that the result of the recognition process is not correct, the measurement is performed with the measurement direction brought close to the direction of when correct recognition is made one before, and the three-dimensional information judged that correct recognition is performed is coordinate transformed based on the recognition result and then added to the three-dimensional model.

If judged that the work model WM has rotated once from the recognition result judged as correct ("YES" in ST208), a series of processes related to the measurement is terminated. A notification that measurement is finished is also notified to the user through methods such as displaying a predetermined message on the display unit 27. Thereafter, the process of removing the noise of the three-dimensional model (process similar to ST117 of FIG. 13) is executed (ST209), and the three-dimensional model after noise removal is actually registered (ST210).

According to the above method, an appropriate three-dimensional model can be created before the rotation of the work model WM is finished by having the user rotate the work model WM according to the correct procedure and perform the selecting operation. The calculation can be simplified since the positional shift amount and the rotation angle do not need to be obtained every time the second and subsequent measurements are performed.

3-5) Example of Using a Plurality of Marks M

In the above-described embodiment, the three-dimensional model representing the entire shape of the contour line of the work W is created by rotating the work model WM with respect to the Y1 axis of the work coordinate system so that a specific surface along the X1Z1 plane of the work model WM is always in contact with the XZ plane of the measurement coordinate system, but the work model WM may also be rotated in the direction other than the Y1 axis to further enhance the accuracy of the three-dimensional model. In this case, it becomes difficult to have each camera 11 to 13 to always image the mark M, but such a problem can be solved by attaching a plurality of marks M to the work model WM as in the embodiment described below.

Figure 15A:
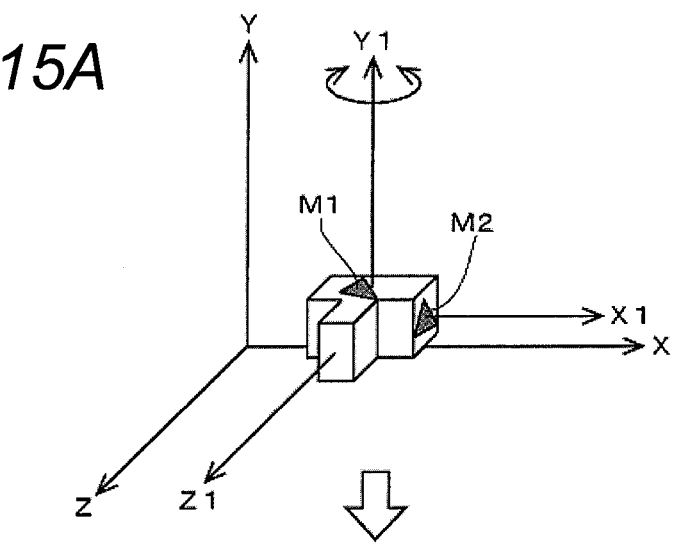
FIGS. 15A to 15C are views showing an example of a measurement method by a work model attached with two marks.
Figure 15B:
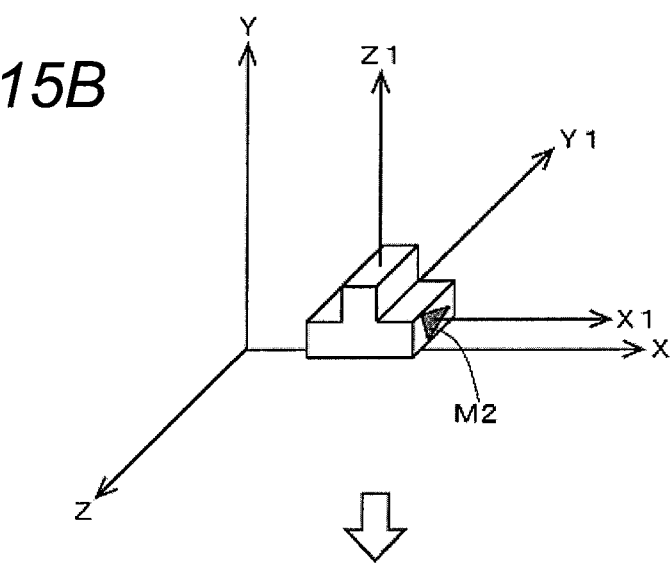
Figure 15C:
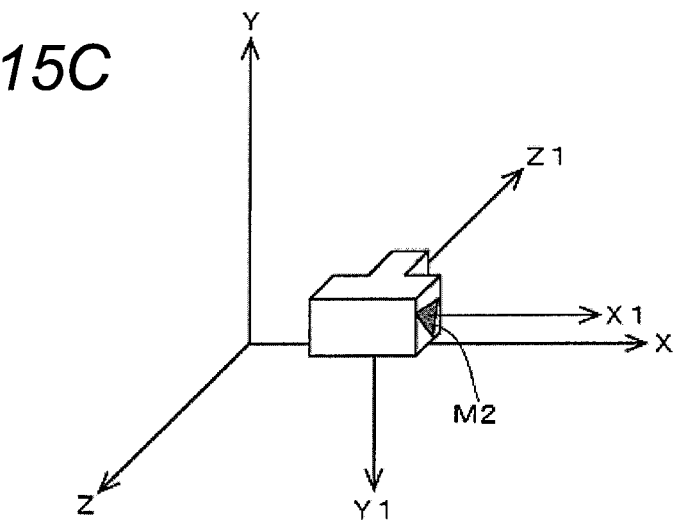

FIGS. 15A to 15C show examples of the measurement process of when creating the three-dimensional model using the work model WM attached with two marks M1, M2. As shown in FIG. 15A, one mark M1 is attached to a position that becomes the upper surface when the work model WM is arranged such that the Y1 axis of the work coordinate system becomes parallel to the Y axis, and the other mark M2 is attached to the side surface of the work model WM. Each mark M1, M2 is a triangle with the ratio of each side set as shown in FIG. 6, but the size is appropriately changed according to the size of the attachment surface.

Similar to the example shown in FIGS. 4A and 4B, in this embodiment, the measurement of a plurality of times is performed while rotating the work model WM with respect to the Y1 axis (FIG. 15A). After a series of measurements is finished, the rotation axis is changed from the Y1 axis to the X1 axis, and the measurement is performed with the work model WM rotated by 90 degrees, as shown in FIG. 15B. Furthermore, the work model WM is again rotated by 90 degrees and the measurement is performed, as shown in FIG. 15C.

When performing the measurement with the work model WM rotated with respect to the Y1 axis, the mark M1 is always contained in the view of each camera 11 to 13, and when performing the measurement with the work model WM rotated with respect to the X1 axis, the mark M2 is always contained in the view of each camera 11 to 13. Furthermore, at least when transitioning from the rotation with respect to the Y1 axis to the rotation with respect to the X1 axis, the measurement is performed after setting a state in which both two marks M1, M2 are contained in the view of the cameras 11 to 13.

Figure 16:
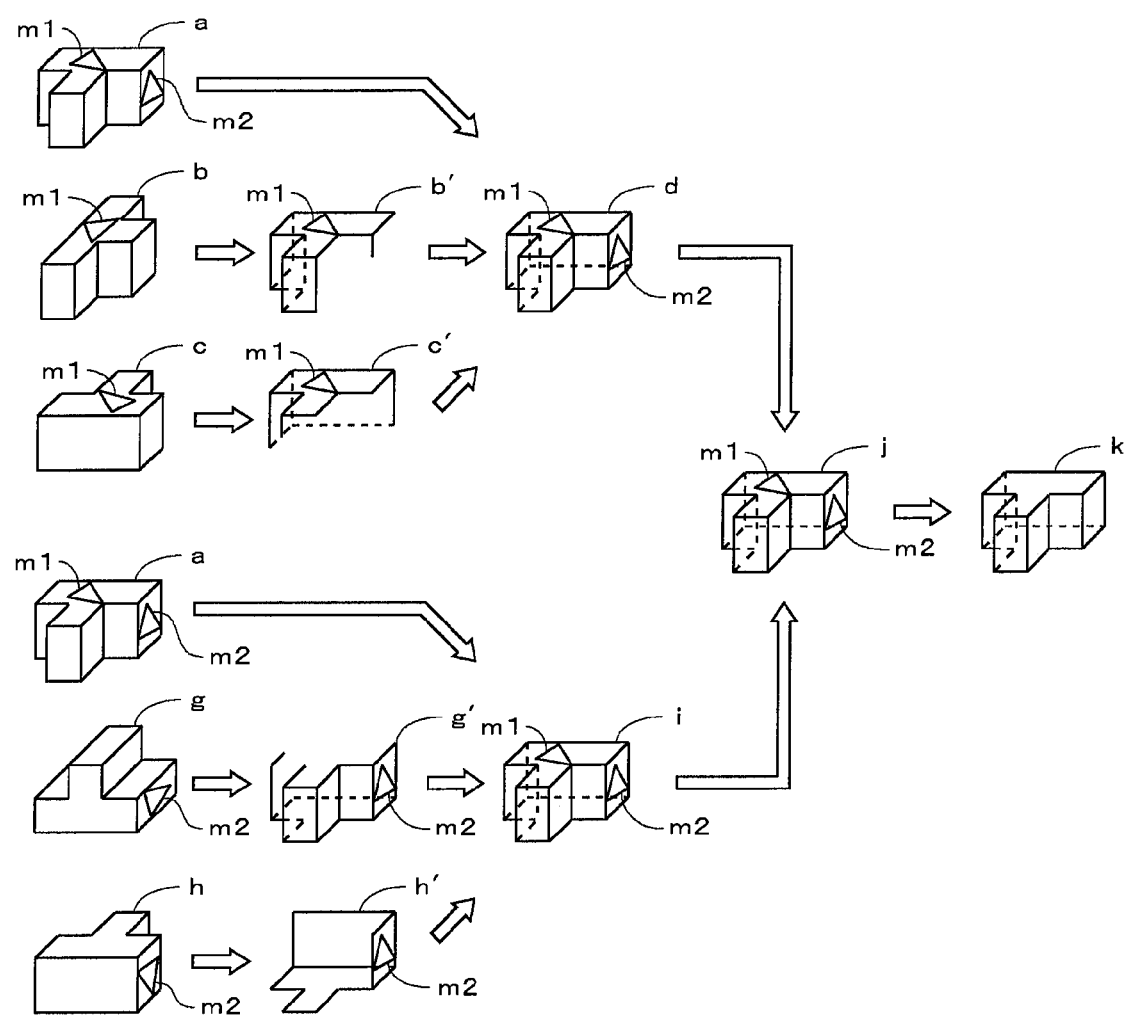
FIG. 16 is a view showing a schematic procedure of when creating the three-dimensional model using the three-dimensional information restored by the measurement method of FIG. 15.
Figure 17:
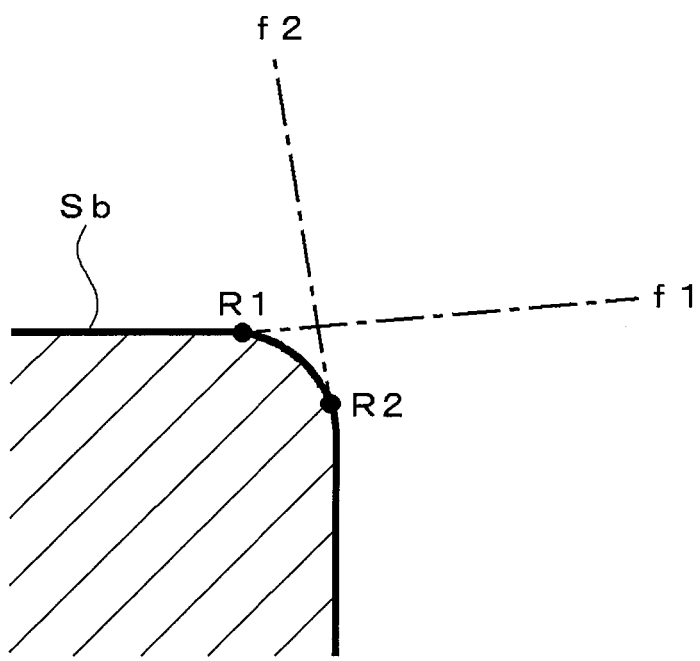
FIG. 17 is a view describing a cause an error that occurs in the correspondence of the three-dimensional information.
Figure 18:
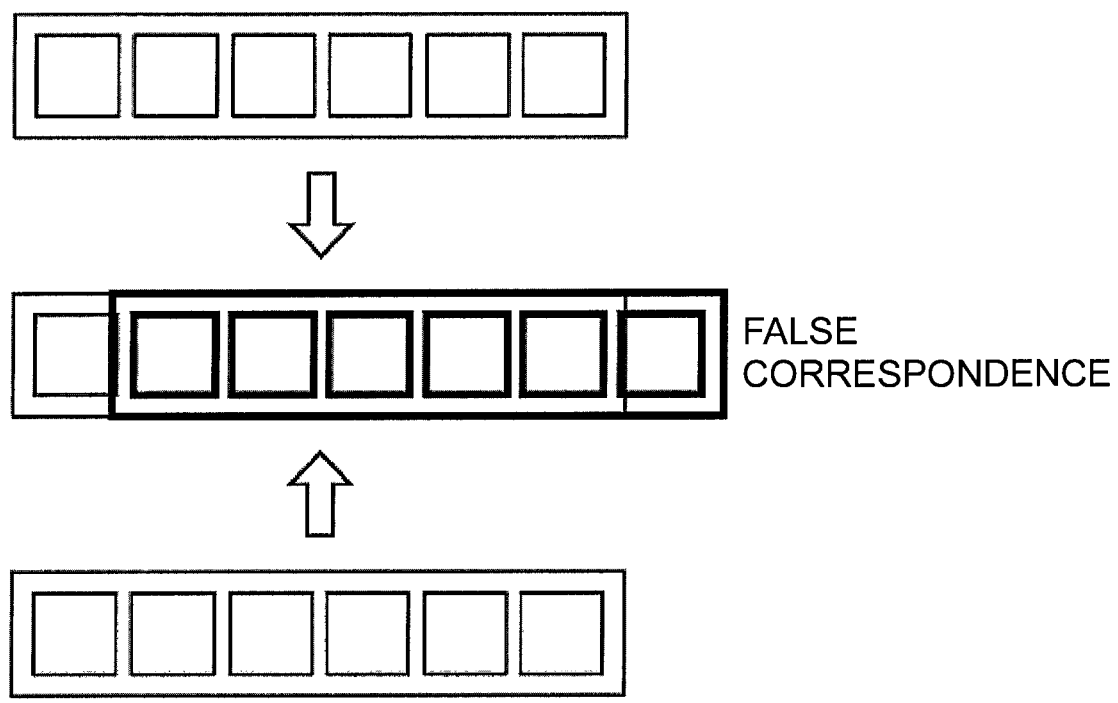
FIG. 18 is a view describing another cause an error that occurs in the correspondence of the three-dimensional information.

FIG. 16 shows an example of integrating the three-dimensional information restored by the measurement process.

In the figure, a, b, and c denote the three-dimensional information restored while the work model WM is rotating with respect to the Y1 axis, similar to the example of FIG. 5. Among such three-dimensional information, the three-dimensional information a contains the information m1, m2 of the two marks M1, M2. Other three-dimensional information b and c contain the information m1 of the mark M1 but do not contain the information of the mark M2.

Next, g in the figure denotes the three-dimensional information restored by the measurement of when the work model WM is arranged in the state of FIG. 15B. Furthermore, h denotes the three-dimensional information restored by the measurement of when the work model WM is arranged in the state of FIG. 15C. Such three-dimensional information g, h contain the information m2 corresponding to the mark M2 but do not contain the information corresponding to the mark M1.

In this embodiment, the integration process similar to the example of FIG. 5 is performed for the three-dimensional information a, b, and c. In other words, with the three-dimensional information a as a reference, the three-dimensional information b, c are coordinate transformed so as to be aligned with the reference three-dimensional information a, and then the three-dimensional information b', c' after the transformation and the reference three-dimensional information a are integrated to create the information d. Since the three-dimensional information a, b, c respectively contains the information m1 corresponding to the mark M1, the accuracy of the alignment process can be ensured by the information m1.

In this embodiment, the coordinate transformation for alignment with the three-dimensional information a is also performed on the three-dimensional information g, h restored through the method of performing the measurement with the work model WM rotated with respect to the X1 axis. The three-dimensional information g', h' after the transformation and the three-dimensional information a are integrated to create information i. Since the three-dimensional information a, g, h respectively contains the information m2 corresponding to the mark M2, the accuracy of the alignment process can be ensured by the information m2.

Subsequently, the integrated information d created by the three-dimensional information a, b, c and the integrated information i created by the three-dimensional information a, g, h are integrated to create three-dimensional information j representing the contour shape of the entire surface of the work model WM and the contour shape of the marks M1, M2. The information m1, m2 corresponding to the marks M1, M2 are then erased from the three-dimensional information j to create the three-dimensional information k representing only the entire contour shape of the work model WM, which is confirmed as the three-dimensional model.

In the above process, the integrated information d, i are created through alignment having the three-dimensional information a as the reference, but in theory, positional shift and rotation do not occur between the information, and thus the three-dimensional information can be easily integrated. Even if a slight shift occurs between the information d, i due to influence of measurement error and the like, alignment with satisfactory accuracy can be performed with the information m1, m2 of the marks M1, M2 commonly contained in both information.

When rotating the work model WM with respect to the X1 axis as well, the orientation of the work model WM is changed in a plurality of ways by rotating the work model WM with respect to an axis (Z1 axis in the case of FIG. 15B and Y1 axis in the case of FIG. 15C) orthogonal to the XZ plane under the relevant state every time the work model WM is rotated by 90 degrees, and the measurement may be performed for each change. In this case as well, a predetermined number (two or more) of pieces of three-dimensional information of a plurality of pieces of three-dimensional information restored by each measurement can be selected as the integrating target. Furthermore, the work model WM may be arranged such that the surface attached with the mark M2 becomes the upper surface, and the measurement may be performed with the orientation similarly changed in various ways.

In this embodiment as well, a process of matching the three-dimensional information that is not adopted in the integration process by three-dimensional model k created by the integration process, determining whether or not a correct recognition is performed, and newly adding the three-dimensional information of the matching target to the three-dimensional model when the recognition fails can be performed.

Moreover, the mark to be attached to the work model WM is not limited to one or two, and three or more marks may be attached. In this case as well, with one of the marks as a reference, the measurement is performed with a state in which the other marks are contained in the view of each camera 11 to 13 along with the reference mark set at least once, so that the alignment of each piece of three-dimensional information to be integrated can be performed through the three-dimensional information containing the information of the two or more marks. The accuracy of such alignment also can be ensured.

3-6) Other Examples Related to Method of Creating Three-Dimensional Model

In the above description, an embodiment of creating the three-dimensional model through a method of having the user change the measurement direction with respect to the work model WM at an arbitrary angle has been described, but a three-dimensional model with suppressed capacity can be created with satisfactory accuracy by applying each example described above even when regularly rotating the work model WM using the rotary table, and the like.

When performing the stereo measurement by changing the measurement direction by a constant angle with the rotary table and the like, the positional relationship between the restored three-dimensional information can be easily specified without adopting the method of performing matching with the three-dimensional information of one stage before every time the measurement is performed. Therefore, the calculation related to creating the three-dimensional model can be simplified.

In the processes shown in FIGS. 13 and 21, the stereo measurement is continued while the work model WM makes one rotation with respect to one axis (Y1 axis) of the work coordinate system, but the present invention is not limited thereto, and the measurement may be terminated when the work model WM rotates in the assumed range if the range of change in the assumed direction of the work is smaller than 360 degrees.

In addition, the terminating timing of measurement may not be automatically determined by the rotation angle, and the recognized rotation angle may be displayed so that the user can judge the terminating timing.

The rotation axis of the work model WM is not limited to one axis, and the work model WM may be rotated with respect to a plurality of axes, as shown in FIGS. 15A to 15C.

The process complying with the flowchart of FIG. 13 thus can be executed even if the variation in the measurement direction with respect to the work model WM is increased. In this case, the accuracy of matching can be ensured due to the presence of the mark M1 while performing the measurement with the work model WM rotated with respect to the Y1 axis, and the accuracy of matching can be ensured due to the presence of the mark M2 while performing the measurement with the work model WM rotated with respect to the X1 axis. Thus, the accuracy of the three-dimensional model to be created can be ensured.

When changing the orientation of the work model WM more freely with respect to the stereo camera 1 without managing the direction of axial rotation of the work model WM as in the example of FIGS. 15A to 15C, the three-dimensional model with suppressed capacity can be created with satisfactory accuracy by adding the necessary three-dimensional information to the temporary three-dimensional model while having the user check the measurement result of each time according to the process complying with the flowchart of FIG. 21.

What is claimed is:

1. A method of creating a three-dimensional model of an object using a stereo image including a set of images obtained by imaging with each of a plurality of cameras, whose relative positions are fixed, the method comprising the steps of:
    attaching a mark having a shape without rotation symmetric property to a surface of the object;
    acquiring a plurality of sets of stereo images by executing imaging over a plurality of times while changing a positional relationship between each camera and the object every time;
    restoring, using one or more computers, three-dimensional information representing a feature of a contour line of the object and the mark from the stereo images;
    matching, using the one or more computers, the three-dimensional information restored by the stereo image with three-dimensional feature data of the mark, wherein the three-dimensional feature data of the mark represents a feature of a contour line of the mark;
    determining whether the feature of the contour line of the mark is substantially restored;
    integrating, using the one or more computers, all of the restored three-dimensional information or two or more pieces of three-dimensional information corresponding to one part of the plurality of pieces of three-dimensional information restored with the imaging over a plurality of times after aligning; and
    erasing or invalidating information corresponding to the mark from the integrated three-dimensional information and confirming the three-dimensional information with the information corresponding to the mark is erased or invalidated from the integrated three-dimensional information as the three-dimensional model,
    wherein the shape is a polygon, and
    wherein at least one side of the polygon has a length not equal to any other side.

2. The method of creating the three-dimensional model according to claim 1, wherein the mark is attached to a flat area on the surface of the object.

3. The method of creating the three-dimensional model according to claim 1, wherein the mark is integrally formed with a background having a color different from the mark, and an integrated object is attached to the surface of the object.

4. The method of creating the three-dimensional model according to claim 1, wherein
    the three-dimensional feature data of the mark is registered in advance; and
    prior to the process of integrating the three-dimensional information, the three-dimensional information determined that the geometric feature is not substantially restored is excluded from a target of the integration process.

5. The method of creating the three-dimensional model according to claim 1, wherein in the process of restoring the three-dimensional information, a step of detecting an edge from the stereo image, a step of dividing the detected edge to a plurality of two-dimensional segments, a step of corresponding each two-dimensional segment between images, calculating a plurality of three-dimensional coordinates for every set of corresponding segments, and setting a three-dimensional segment including a line or a curve according to a distribution state of the three-dimensional coordinates, and a step of setting each three-dimensional segment or an intersection of extended lines as a feature point are executed; and in the process of aligning before integrating of the three-dimensional information, with one of the three-dimensional information to be integrated as a reference, the other three-dimensional information are aligned so that the feature point and the three-dimensional segment most matches the reference three-dimensional information.

6. The method of creating the three-dimensional model according to claim 1, further comprising the steps of attaching first and second marks having a shape without rotation symmetric property to different areas on the surface of the object, and adjusting the positional relationship between each camera and the object in the imaging over a plurality of times so that a state in which each of the marks is contained in a view of all cameras is satisfied in a plurality of ways and a state in which both the first and the second marks are contained in the view of each camera is satisfied at least once; and aligning the three-dimensional information restored from the stereo image of when imaged with only the first mark contained in the view of each camera and the three-dimensional information restored from the stereo image of when imaged with only the second mark contained in the view of each camera to the three-dimensional information restored from the stereo image of when imaged with both the first and the second marks contained in the view of each camera, and integrating the three-dimensional information.

7. The method of creating the three-dimensional model according to claim 1, further comprising the steps of:

creating a temporary three-dimensional model using the three-dimensional information restored by at least one set of stereo images of the object;

calculating a coincidence degree between the three-dimensional information restored by the stereo image in a direction different from the direction employed when the three-dimensional information used in creating the temporary three-dimensional model with respect to the object is restored, and the temporary three-dimensional model; and adding the three-dimensional information, which is a target of calculation of the coincidence degree, to the temporary three-dimensional model when determined that the coincidence degree is low, and confirming the three-dimensional model at a time point the adding process is completed as a model to use for recognition of the object.

8. An object recognizing device comprising one or more computers configured to form the following components:

an image input unit configured to input a stereo image of a target object to be recognized generated by a plurality of cameras, whose relative positions are fixed;

a three-dimensional measurement unit configured to restore three-dimensional information from the stereo image;

a recognition processing unit configured to recognize a position and an orientation of the target object to be recognized by matching the three-dimensional information with a three-dimensional model registered in advance; and a three-dimensional model registering unit configured to create and register the three-dimensional model, wherein the three-dimensional model registering unit includes, a mark registering portion configured to register three-dimensional feature data representing a geometric feature of a mark having a shape without rotation symmetric property, a measurement control portion configured to, assuming the target object to be recognized having the mark attached to a surface is imaged over a plurality of times while a positional relationship with respect to each camera is changed every time, accept the stereo image generated by the imaging of each time from the image input unit, and cause the three-dimensional measurement unit to process the stereo image, a determining portion configured to match the three-dimensional information restored from the stereo image with the three-dimensional feature data registered in the mark registering portion and determine whether or not the geometric feature of the mark is substantially restored, a three-dimensional information integrating portion configured to integrate two or more pieces of three-dimensional information that are determined that the geometric feature of the mark is substantially restored out of the plurality of pieces of three-dimensional information restored with the imaging of a plurality of times, after aligning, and a model confirming portion configured to confirm the three-dimensional information with information corresponding to the mark in the integrated three-dimensional information is erased or invalidated as a three-dimensional model to be registered, wherein the shape is a polygon, and wherein at least one side of the polygon has a length not equal to any other side.

* * * * *